United States Patent
Suzuki et al.

(10) Patent No.: US 8,188,976 B2
(45) Date of Patent: May 29, 2012

(54) MOBILE TERMINAL DEVICE AND PROGRAM USED IN MOBILE TERMINAL DEVICE

(75) Inventors: Toshiyuki Suzuki, Yokohama (JP);
Toshihiro Azami, Yokosuka (JP);
Hiroshi Inamura, Yokosuka (JP);
Toshio Kaneda, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 773 days.

(21) Appl. No.: 11/520,650

(22) Filed: Sep. 14, 2006

(65) Prior Publication Data

US 2008/0227499 A1 Sep. 18, 2008

(30) Foreign Application Priority Data

Sep. 14, 2005 (JP) ................. P2005-267540
Sep. 14, 2005 (JP) ................. P2005-267541

(51) Int. Cl.
*G06F 3/02* (2006.01)
*G09G 5/00* (2006.01)
(52) U.S. Cl. ..................... 345/169; 345/173
(58) Field of Classification Search ........... 345/156, 345/168, 169, 173; 715/700–866
See application file for complete search history.

(56) References Cited

U.S. PATENT DOCUMENTS

| | | | |
|---|---|---|---|
| 6,169,538 B1 * | 1/2001 | Nowlan et al. | 345/168 |
| 6,211,856 B1 * | 4/2001 | Choi et al. | 345/666 |
| 6,744,422 B1 * | 6/2004 | Schillings et al. | 345/169 |
| 6,894,679 B2 | 5/2005 | Suzuki | |
| 7,151,530 B2 * | 12/2006 | Roeber et al. | 345/168 |
| 2002/0028697 A1 * | 3/2002 | Davies | 455/566 |
| 2003/0222858 A1 * | 12/2003 | Kobayashi | 345/173 |
| 2004/0201576 A1 * | 10/2004 | Shimada et al. | 345/173 |

FOREIGN PATENT DOCUMENTS

| | | |
|---|---|---|
| CN | 1353528 A | 6/2002 |
| CN | 1524212 A | 8/2004 |
| GB | 2 371 453 A | 7/2002 |
| JP | 3-4931 | 1/1991 |
| JP | 04-163612 | 6/1992 |
| JP | 2001-236180 | 8/2001 |
| JP | 2002-55766 | 2/2002 |
| JP | 2003-50658 | 2/2003 |
| JP | 2003-99180 | 4/2003 |
| WO | WO 02/095524 A2 | 11/2002 |

OTHER PUBLICATIONS

U.S. Appl. No. 11/559,180, filed Nov. 13, 2006, Suzuki, et al.

* cited by examiner

*Primary Examiner* — Amr Awad
*Assistant Examiner* — Kenneth Bukowski
(74) *Attorney, Agent, or Firm* — Oblon, Spivak, McClelland, Maier & Neustadt, L.L.P.

(57) ABSTRACT

A mobile terminal device provided with a plurality of keys includes: a touch pad and a touch detection interface which detect a user touching a key; a press detection interface which detects the user pressing the key; a display unit which sequentially displays characters, as candidate characters, assigned to the key pressed by the user, when the press detection interface detects the user pressing the key; and a controller which converts the candidate character displayed on the display unit to a finalized character, when an untouched time period during the user does not touch the pressed key reaches a predetermined judging time after the press detection interface detects the user pressing the key.

19 Claims, 36 Drawing Sheets

: FINALIZATION REGION

FIG. 4

| TYPE OF KEY | CHARACTER |
|---|---|
| 1 | 「あ」→「い」→「う」→「え」→「お」 |
| 2 | 「か」→「き」→「く」→「け」→「こ」 |
| 3 | 「さ」→「し」→「す」→「せ」→「そ」 |
| 4 | 「た」→「ち」→「つ」→「て」→「と」 |
| 5 | 「な」→「に」→「ぬ」→「ね」→「の」 |
| 6 | 「は」→「ひ」→「ふ」→「へ」→「ほ」 |
| 7 | 「ま」→「み」→「む」→「め」→「も」 |
| 8 | 「や」→「ゆ」→「よ」 |
| 9 | 「ら」→「り」→「る」→「れ」→「ろ」 |
| ＊ | 「゛」→「゜」 |
| 0 | 「わ」→「を」→「ん」 |
| ＃ | 「-」→「、」→「。」→「？」→「！」 |

| TYPE OF KEY | Xmin | Xmax | Ymin | Ymax |
|---|---|---|---|---|
| 1 | 0 | 70 | 60 | 110 |
| 2 | 80 | 150 | 60 | 110 |
| 3 | 160 | 230 | 60 | 110 |
| 4 | 0 | 70 | 120 | 170 |
| 5 | 80 | 150 | 120 | 170 |
| 6 | 160 | 230 | 120 | 170 |
| 7 | 0 | 70 | 180 | 230 |
| 8 | 80 | 150 | 180 | 230 |
| 9 | 160 | 230 | 180 | 230 |
| * | 0 | 70 | 240 | 290 |
| 0 | 80 | 150 | 240 | 290 |
| # | 160 | 230 | 240 | 290 |

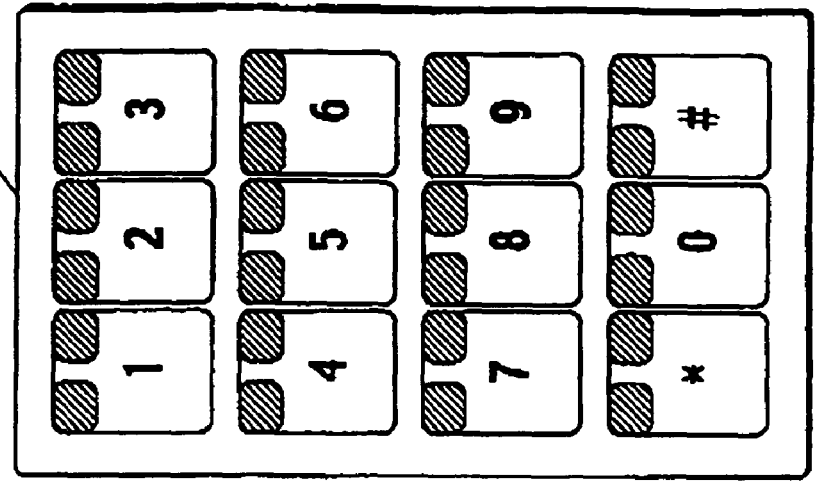
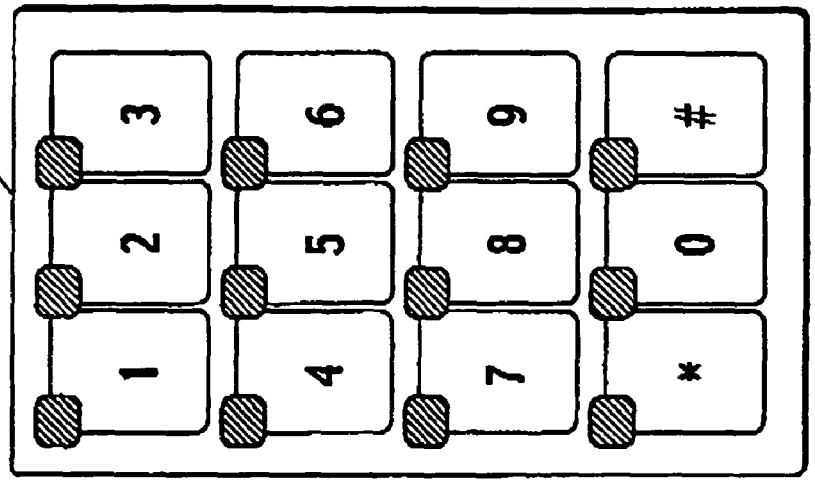
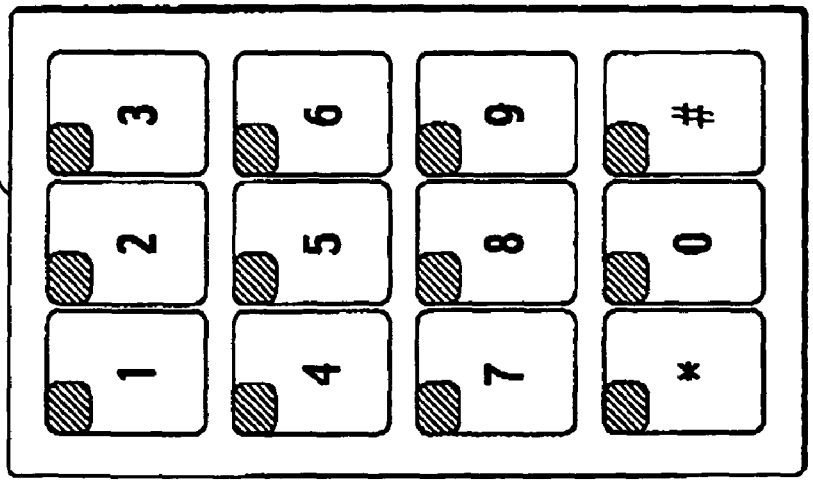

FIG. 10

| TYPE OF KEY | KEY AREA | | | | PARTICULAR CORRESPONDING REGION (LEFT) | | | | PARTICULAR CORRESPONDING REGION (RIGHT) | | | |
|---|---|---|---|---|---|---|---|---|---|---|---|---|
| | KXmin | KXmax | KYmin | KYmax | FLXmin | FLXmax | FLYmin | FLYmax | FRXmin | FRXmax | FRYmin | FRYmax |
| 1 | 0 | 100 | 0 | 60 | 0 | 40 | 0 | 20 | 60 | 100 | 0 | 20 |
| 2 | 110 | 210 | 0 | 60 | 110 | 150 | 0 | 20 | 170 | 210 | 0 | 20 |
| 3 | 220 | 320 | 0 | 60 | 220 | 260 | 0 | 20 | 280 | 320 | 0 | 20 |
| 4 | 0 | 100 | 70 | 130 | 0 | 40 | 70 | 90 | 60 | 100 | 70 | 90 |
| 5 | 110 | 210 | 70 | 130 | 110 | 150 | 70 | 90 | 170 | 210 | 70 | 90 |
| 6 | 220 | 320 | 70 | 130 | 220 | 260 | 70 | 90 | 280 | 320 | 70 | 90 |
| 7 | 0 | 100 | 140 | 200 | 0 | 40 | 140 | 160 | 60 | 100 | 140 | 160 |
| 8 | 110 | 210 | 140 | 200 | 110 | 150 | 140 | 160 | 170 | 210 | 140 | 160 |
| 9 | 220 | 320 | 140 | 200 | 220 | 260 | 140 | 160 | 280 | 320 | 140 | 160 |
| * | 0 | 100 | 210 | 270 | 0 | 40 | 210 | 230 | 60 | 100 | 210 | 230 |
| 0 | 110 | 210 | 210 | 270 | 110 | 150 | 210 | 230 | 170 | 210 | 210 | 230 |
| # | 220 | 320 | 210 | 270 | 220 | 260 | 210 | 230 | 280 | 320 | 210 | 230 |

FIG. 12
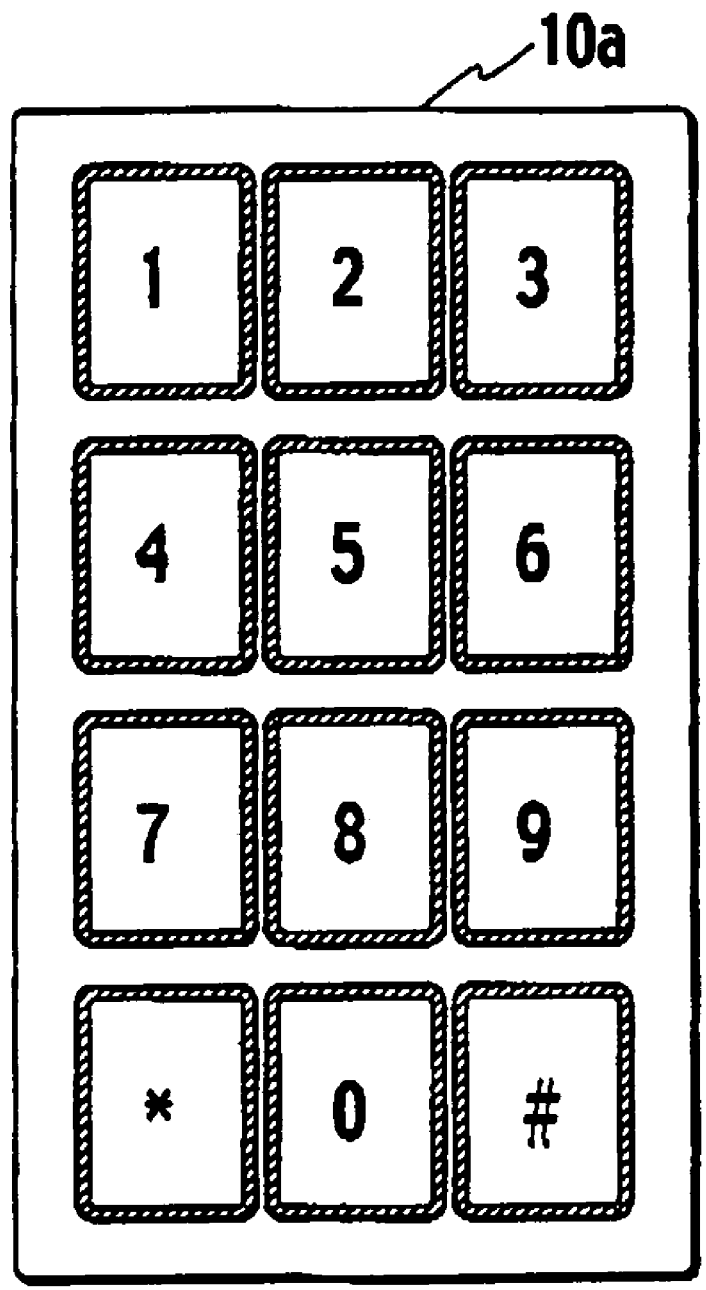
: FINALIZATION REGION

FIG. 13
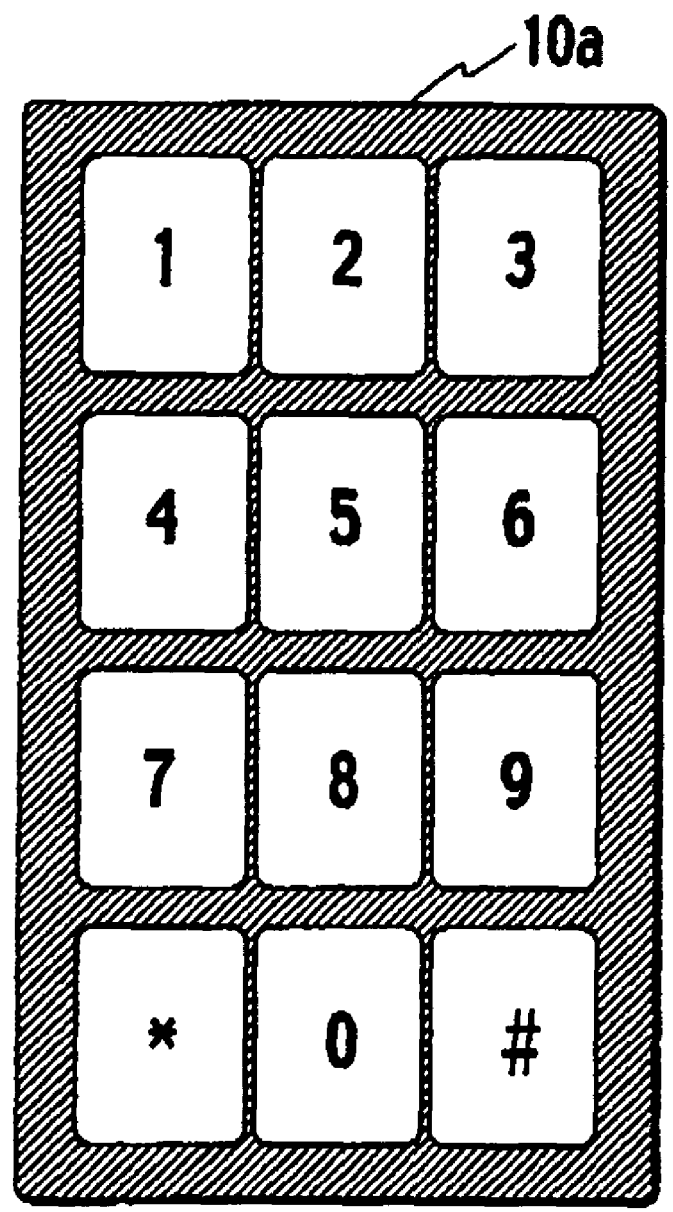
 : FINALIZATION REGION

FIG. 32A

| KEY TYPE | TOUCH TIME | REMARKS |
|---|---|---|
| 1 | 10:12:30.3 | FIRST KEY GROUP |
| 2 | 0 | |
| 3 | 10:15:22.1 | SECOND KEY GROUP |
| 4 | 0 | |
| 5 | 0 | |
| 6 | 0 | |
| 7 | 0 | |
| 8 | 0 | |
| 9 | 0 | |
| * | 0 | |
| 0 | 0 | |
| # | 0 | |

FIG. 32C

| KEY TYPE | TOUCH TIME | REMARKS |
|---|---|---|
| 1 | 10:15:23.5 | SECOND KEY GROUP |
| 2 | 0 | |
| 3 | 0 | |
| 4 | 10:15:23.5 | SECOND KEY GROUP |
| 5 | 0 | |
| 6 | 10:07:33.1 | FIRST KEY GROUP |
| 7 | 10:15:23.5 | SECOND KEY GROUP |
| 8 | 0 | |
| 9 | 0 | |
| * | 0 | |
| 0 | 0 | |
| # | 0 | |

FIG. 32B

| KEY TYPE | TOUCH TIME | REMARKS |
|---|---|---|
| 1 | 10:12:30.3 | FIRST KEY GROUP |
| 2 | 0 | |
| 3 | 10:15:22.1 | SECOND KEY GROUP |
| 4 | 0 | |
| 5 | 10:18:44.5 | THIRD KEY GROUP |
| 6 | 0 | |
| 7 | 0 | |
| 8 | 0 | |
| 9 | 0 | |
| * | 0 | |
| 0 | 0 | |
| # | 0 | |

FIG. 32D

| KEY TYPE | TOUCH TIME | REMARKS |
|---|---|---|
| 1 | 10:42:21.9 | FIRST KEY GROUP |
| 2 | 0 | |
| 3 | 0 | |
| 4 | 0 | |
| 5 | 0 | |
| 6 | 0 | |
| 7 | 10:51:35.2 | SECOND KEY GROUP |
| 8 | 10:51:35.2 | SECOND KEY GROUP |
| 9 | 10:51:35.2 | SECOND KEY GROUP |
| * | 0 | |
| 0 | 0 | |
| # | 0 | |

COUNTER (Cnt) > 0

MOBILE TERMINAL DEVICE AND PROGRAM USED IN MOBILE TERMINAL DEVICE

CROSS REFERENCE TO RELATED APPLICATIONS

This application is based upon and claims the benefit of priority from prior Japanese Patent Application No. 2005-267540, filed on Sep. 14, 2005; and prior Japanese Patent Application No. 2005-267541, filed on Sep. 14, 2005; the entire contents of which are incorporated herein by reference.

BACKGROUND OF THE INVENTION

1. Field of the Invention

The present invention relates to a mobile terminal device provided with a plurality of keys, each of which is assigned a plurality of characters.

2. Description of the Related Art

Heretofore, a mobile terminal device such as a mobile telephone has been provided with a plurality of keys (e.g., numeric keys "0" to "9" and symbol keys "*" and "#") in order for a user to enter a telephone number. In such a mobile terminal device, each key is assigned characters in order for the user to enter the characters when the user creates an e-mail message, or the like. Each key is assigned a plurality of characters because the number of keys provided for the mobile terminal device is limited on account of the portability of the mobile terminal device.

Specifically, when the user presses a key, the mobile terminal device switches display from one character to another on a display region. Then, when the user performs operation for character finalization, the mobile terminal device converts a character displayed on the display region to a finalized character. Incidentally, the operations for character finalization include the user's operation of pressing a different key from the key assigned the character displayed on the display region, and the user's operation of pressing a cursor key.

For example a mobile terminal device in which the numeric key "1" is assigned hiragana characters specifically "a," "i," "u," "e," and "o," belonging to the first, specifically "a" column of the Japanese kana syllabary. Each time the user presses the numeric key "1," the mobile terminal device switches display from "a" to, in turn, "i," "U," "e," and "o." When the user presses the numeric key "2" or the cursor key under a condition where "u" is displayed on the display region, the mobile terminal device converts "u" displayed on the display region to a finalized character.

A method of entry mentioned above (hereinafter referred to as a "five-touch method") involves complicated operations for character entry, because the user, even in a case where the user wants to make sequential entries of characters assigned to one key, has to press some other key in order to convert the character displayed on the display region to a finalized character.

For example, in a case where the user wants to enter the hiragana characters "i" and "e" in sequence, the user cannot convert "i" to a finalized character unless performing the operation for character finalization while "i" is displayed on the display region.

Also proposed is a mobile terminal device which has a function of detecting a user touching a key with the user's finger and converting a displayed character to a finalized character when the user moves one's finger off the key while the character is displayed on the display region (see, for example, Unexamined Japanese Patent Application No. 2002-55766, claim 1, FIG. 7, and so on). Such a mobile terminal device saves the user having to perform the operation for character finalization and thus facilitates the user's operations for character entry.

However, the mobile terminal device, which is designed to convert a displayed character to a finalized character when a user moves one's finger off a key while the character is displayed on the display region, converts an unintended character to a finalized character when the user moves one's finger off the key in situations where the user changes one's grip to hold the mobile terminal device or does the like.

Moreover, as a mobile terminal device such as a cellular phone, there has heretofore been known a mobile terminal device in which function keys for executing an on-hook function, an off-hook function, a function of calling a menu screen and the like are provided, in addition to 12 keys ("0" to "9," "*" and "#") for entering a telephone number and the like. Recently, mobile terminal devices feature sophisticated functions. Thus, in order for a user to utilize the sophisticated functions, a plurality of functions are assigned to the 12 keys and the function keys.

In such a mobile terminal device, the functions assigned to the keys differ according to an operation mode of the mobile terminal device. For this reason, it is difficult for the user to figure out the functions assigned to the keys. Consequently, a false key operation is likely to occur.

It is assumed that the mobile terminal device is used in dark surroundings. In this assumed case, even if the user has figured out the functions assigned to the keys, the false key operation is likely to occur when the user operates the mobile terminal device in the dark surroundings.

Meanwhile, as a mobile terminal device intended to prevent the false key operation, there has been proposed a mobile terminal device which has a function of detecting a user touching the keys. In the case of a mobile terminal device of this type, when the user touches any of the keys, an explanation on a function which is assigned to the key touched by the user is displayed before the user presses the key (see for example, Unexamined Japanese Patent Application No. 2002-55766).

Specifically, upon detection of a user's finger touching any of the keys, the mobile terminal device displays, in a display area, a character assigned to the key touched by the user. Moreover, upon detection of the user's finger moving away from the key, the mobile terminal device finalizes the character displayed in the display area.

Incidentally, as a method of detecting the user touching the keys, an analog method and a discrete method are cited.

As one of the analog methods, there is a resistive film method using a resistive film. In the resistive film method, a voltage value is obtained by resistive division to detect the user touching the keys. On the other hand, in the discrete method, a plurality of detecting elements are provided for each of the keys. In one of the discrete methods, a capacity, which is generated between an electrode provided for each key and the human body, is obtained. Thereafter, by detecting an electrode of which capacity is changed, a touch on any of the keys by the user is detected.

Generally, in the analog method, coordinates of only one point can be detected. On the other hand, in the discrete method, coordinates of two points or more can be detected. As a result, when the discrete method is applied to a touch pad, detection can be made for the user touching a plurality of keys. Thus, there is an advantage that the range of user interface design is expanded.

However, when the user tries to touch one key and accidentally touches more than one key, it is difficult to identify the key which the user has intentionally touched.

As a mobile terminal device such as a cellular phone, there has heretofore been known a mobile terminal device in which function keys for executing an on-hook function, an off-hook function, a function of calling a menu screen and the like are provided, in addition to 12 keys ("0" to "9," "*" and "#") for entering a telephone number and the like. Recently, mobile terminal devices feature sophisticated functions. Thus, in order for a user to utilize the sophisticated functions, a plurality of functions are assigned to the 12 keys and the function keys.

In such a mobile terminal device, the functions assigned to the keys differ according to an operation mode of the mobile terminal device. For this reason, it is difficult for the user to figure out the functions assigned to the keys. Consequently, a false key operation is likely to occur.

It is assumed that the mobile terminal device is used in dark surroundings. In this assumed case, even if the user has figured out the functions assigned to the keys, the false key operation is likely to occur when the user operates the mobile terminal device in the dark surroundings.

Meanwhile, as a mobile terminal device intended to prevent the false key operation, there has been proposed a mobile terminal device which has a function of detecting a user touching the keys. In the case of a mobile terminal device of this type, when the user touches any of the keys, an explanation on a function which is assigned to the key touched by the user is displayed before the user presses the key (see, for example, Unexamined Japanese Patent Application No. 2002-55766).

Specifically, upon detection of a user's finger touching any of the keys, the mobile terminal device displays, in a display area, a character assigned to the key touched by the user. Moreover, upon detection of the user's finger moving away from the key, the mobile terminal device finalizes the character displayed in the display area.

Incidentally, as a method of detecting the user touching the keys, an analog method and a discrete method are cited.

As one of the analog methods, there is a resistive film method using a resistive film. In the resistive film method, a voltage value is obtained by resistive division to detect the user touching the keys. On the other hand, in the discrete method, a plurality of detecting elements are provided for each of the keys. In one of the discrete methods, a capacity, which is generated between an electrode provided for each key and the human body, is obtained. Thereafter, by detecting an electrode of which capacity is changed, a touch on any of the keys by the user is detected.

Generally, in the analog method, coordinates of only one point can be detected. On the other hand, in the discrete method, coordinates of two points or more can be detected. As a result, when the discrete method is applied to a touch pad, detection can be made for the user touching a plurality of keys. Thus, there is an advantage that the range of user interface design is expanded.

However, when the user tries to touch one key and accidentally touches more than one key, it is difficult to identify the key which the user has intentionally touched.

SUMMARY OF THE INVENTION

The present invention has been made in consideration for the above-described problems in the related art. It is an object of the present invention to provide a mobile terminal device capable of facilitating operations for character entry, as well as preventing a user from erroneously finalizing a character.

A first aspect of the present invention provides a mobile terminal device provided with a plurality of keys includes: a touch detector (a touch pad 10b and a touch detection interface 11) configured to detect a user touching a key; a press detector (a press detection interface 12) configured to detect the user pressing the key; a display unit (a display unit 20) configured to sequentially display characters, as candidate characters, assigned to the key pressed by the user, when the press detector detects the user pressing the key; and a controller (a controller 14) configured to convert the candidate character displayed on the display unit to a finalized character when an untouched time period during the user does not touch the pressed key reaches a predetermined judging time after the press detector detects the user pressing the key.

According to the first aspect, the mobile terminal device converts the candidate character displayed on the display unit to a finalized character when the untouched time period reaches a predetermined judging time. Thus, the mobile terminal device can prevent an unintended candidate character from being converted to a finalized character when the user moves one's finger off the key in situations where the user changes one's grip to hold the mobile terminal device or does the like, which may occur with the conventional mobile terminal device which converts the candidate character to a finalized character when the user moves one's finger off the key. Moreover, the mobile terminal device of the present invention saves the user having to perform an additional operation for character finalization and thus facilitates user's operations for character entry.

A second aspect of the present invention provides the mobile terminal device according to the first aspect, wherein, the controller converts the candidate character displayed on the display unit to a finalized character when the user touches a corresponding region provided for the pressed key even before the untouched time period reaches a predetermined judging time.

A third aspect of the present invention provides a mobile terminal device provided with a plurality of keys includes: a touch detector configured to detect a user touching the key; a press detector configured to detect the user pressing the key; a display unit configured to sequentially display characters, as candidate characters, assigned to the key pressed by the user, when the press detector detects the user pressing the key; and a controller configured to convert the candidate character displayed on the display unit to a finalized character, when the user touches a corresponding region provided for the pressed key.

According to the third aspect, the mobile terminal device converts the candidate character displayed on the display unit to a finalized character, in a case where the user intentionally touches the corresponding region. Thus, the mobile terminal device can prevent an unintended candidate character from being converted to a finalized character when the user moves one's finger off the key in situations where the user changes one's grip to hold the mobile terminal device or does the like, which may occur with the conventional mobile terminal device which converts the candidate character to a finalized character when the user moves one's finger off the key. Moreover, the user has simply to touch the corresponding region to convert the candidate character displayed on the display unit to a finalized character. Thus, the mobile terminal device of the present invention enables quicker character entry.

A fourth aspect of the present invention provides the mobile terminal device according to any one of the second and third aspects, includes a key-arranged surface (a key-arranged surface 10*a*) on which a plurality of keys are arranged, and the touch detector detects the user touching the key-arranged surface as well as the user touching the key, and the corresponding region is an area on the key-arranged surface except for the pressed key.

A fifth aspect of the present invention provides the mobile terminal device according to any one of the second and third aspects wherein the corresponding region is a different key from the pressed key.

A sixth aspect of the present invention provides the mobile terminal device according to any one of the second and third aspects, wherein the corresponding region is a particular region including at least a part of the pressed key.

A seventh aspect of the present invention provides the mobile terminal device according to the sixth aspect, wherein the controller converts the candidate character displayed on the display unit to a finalized character, when the user touches the particular region of the pressed key while the pressed key is pressed.

An eighth aspect of the present invention provides the mobile terminal device according to the sixth aspect, includes a setting unit (keys 30 and a key assignment information storage section 13) configured to serve for the user to set the position of the particular region, the size of the position of the particular corresponding region, or the number of the positions of the particular regions.

A ninth aspect of the present invention provides a mobile terminal device provided with a plurality of keys includes: a touch detector (a touch pad 10*b* and a touch detection interface 11) configured to detect a user touching the keys; a key specification unit (a controller 14) configured to specify the key touched by the user as an effective contact key, when the user touching the keys is detected; and a screen changing unit (a display controller 15 and a display unit 20) configured to change a screen related to a function which is assigned to the effective contact key specified by the key specification unit. In the mobile terminal device, the touch detector detects the user touching the plurality of keys. When the user touching the plurality of keys by the user is detected, the key specification unit specifies the key touched by the user as the effective contact key, on the bases of key specification criteria set according to arrangement of the keys.

According to the ninth aspect, when the user touching the plurality of keys is detected, the key specification unit specifies the key touched by the user as the effective contact key, on the bases of the key specification criteria set according to the arrangement of the keys.

As described above, in view of the fact that a key (or keys) which the user has accidentally touched and a key (or keys) which the user has intentionally touched are likely to be located close to each other, the key specification criteria are set according to the arrangement of the keys.

Accordingly, the mobile terminal device makes it possible to enhance accuracy of identifying the key which the user has intentionally touched even in a case where the user accidentally touches more than one key.

A tenth aspect of the present invention provides the mobile terminal device according to the ninth aspect, wherein, the plurality of keys are arranged in a plurality of rows extending in the right-left direction of the mobile terminal device, and the plurality of rows are arranged in the vertical direction of the mobile terminal device. The key specification unit specifies one of upper contact keys as the effective contact key, when the upper contact key is single, the upper contact keys are the plurality of keys touched by the user arranged in the row of uppermost in the vertical direction.

A eleventh aspect of the present invention provides the mobile terminal device according to the tenth aspect, further includes: an upper position specification unit (a barycentric coordinates detector 16) configured to specify an upper representative position which is a single position set according to positions of the plurality of the upper contact keys; and a lower position specification unit (the barycentric coordinates detector 16) configured to specify a lower representative position which is a single position set according to positions of a plurality of lower contact keys, the lower contact keys are the plurality of keys touched by the user arranged in the row lower than the row of uppermost. The key specification unit specifies one of the upper contact keys as the effective contact key according to a positional relationship in the right-left direction between the upper representative position and the lower representative position.

A twelfth aspect of the present invention provides the mobile terminal device according to the eleventh aspect, further includes: a specification result storage (a specification history storage 17) configured to store a specification history result, the specification history result is a history of specifying the effective contact key according to the positional relationship. The key specification unit specifies the effective contact key by referring to the specification history result, when the upper representative position and the lower representative position are identical in the right-left direction.

A thirteenth aspect of the present invention provides the mobile terminal device according to the ninth aspect, further includes: a touch time storage (a touch time storage 19) configured to store information associating the keys touched by the user and a touch time, the touch time is a time when the user touching the keys is detected; and a grouping unit (a grouping unit 18) configured to form key groups from the plurality of keys touched by the user when the user touches the plurality of keys, the key groups respectively consist of the key adjacent to one another. The key specification unit identifies a key group including a key having the latest touch time, and specifies the effective contact key from the keys included in the key group identified.

A fourteenth aspect of the present invention provides a program used in a mobile terminal device provided with a plurality of keys, causes a computer to execute the steps of: detecting a user touching the keys; specifying the key touched by the user as an effective contact key, when the user touching the key is detected, on the bases of key specification criteria set according to arrangement of the keys; and changing a screen related to the function assigned to the effective contact key.

According to the present invention, it is made possible to provide a mobile terminal device with which accuracy of identifying a key which the user has intentionally touched can be enhanced even in a case where the user accidentally touches more than one key, and to provide a program used in the mobile terminal device.

BRIEF DESCRIPTION OF THE DRAWINGS

FIG. 4 is a table showing key assignment information according to the first embodiment of the present invention.

FIGS. 9A to 9C are plan views showing particular corresponding regions according to a third embodiment of the present invention.

FIG. 10 is a table showing the coordinates on the key information display region according to the third embodiment of the present invention.

FIG. 12 is a plan view showing an example of finalization regions according to a fourth embodiment of the present invention.

FIG. 13 is a plan view showing another example of a finalization region according to the fourth embodiment of the present invention.

FIGS. 32A to 32D are tables showing touch time information according to the ninth embodiment of the present invention.

DETAILED DESCRIPTION OF THE PREFERRED EMBODIMENTS

Figure 1:
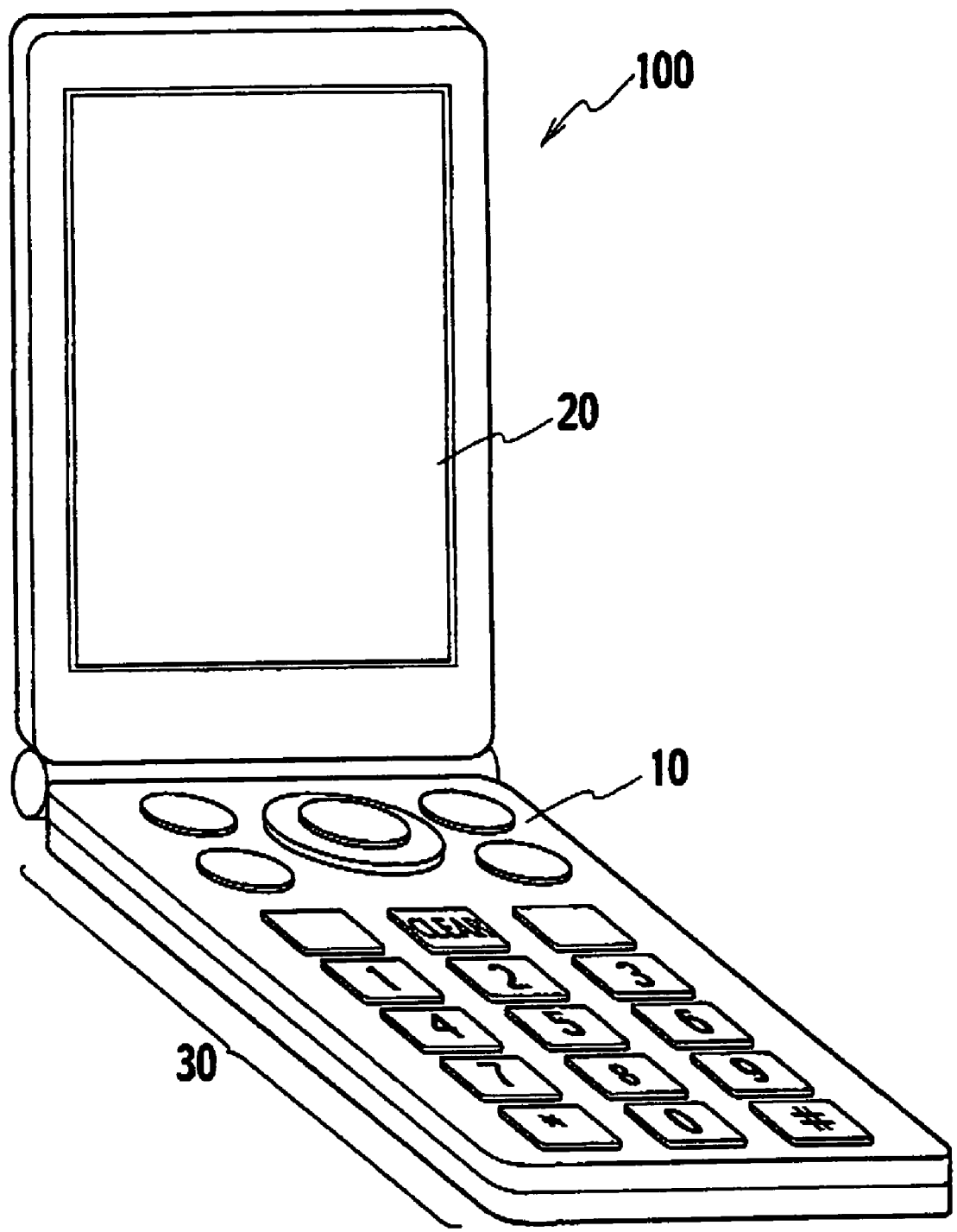
FIG. 1 is an external view showing a mobile terminal device 100 according to a first embodiment of the present invention.

The description will be given below with reference to the drawings with regard to mobile terminal devices according to embodiments of the present invention. In the drawings, the same or similar parts are designated by the same or similar reference numerals. It should be noted that the drawings are schematic and dimensional ratios and the like therein are different from actual ones.

[First Embodiment]

Configuration of Mobile Terminal Device

The description will be given below with reference to the drawings with regard to the configuration of a mobile terminal device according to a first embodiment of the present invention. FIG. 1 is an external view showing a mobile terminal device 100 according to the first embodiment of the present invention.

As shown in FIG. 1, the mobile terminal device 100 includes a main unit 10 and a display unit 20, and the main unit 10 is provided with a plurality of keys 30. The keys 30 include numeric keys "0" to "9," symbol keys "*" and "#," etc. The keys 30 are each assigned a plurality of characters.

The main unit 10 includes a control board 10c to be described later, under control of which the display unit 20 provides sequential display of the characters as candidate characters assigned to the key 30 pressed by a user. The main unit 10 converts the candidate character displayed on the display unit 20 to a finalized character, when predetermined conditions of finalization are satisfied.

The display unit 20 provides a screen display in order for the user to enter the characters to do things such as create an e-mail message. A screen for character entry (hereinafter referred to as a "character entry screen") is configured of a character entry region which receives entry of a character string, and a key information display region which provides display of the characters assigned to each of the keys 30. Incidentally, the details of the character entry screen will be described later (see FIGS. 5A and 5B.)

Specifically, when the user presses the key 30, the character entry region of the display unit 20 provides sequential display of the characters as candidate characters assigned to the pressed key 30. The character entry region of the display unit 20 also provides display of a character string finalized by the user.

Figure 2:
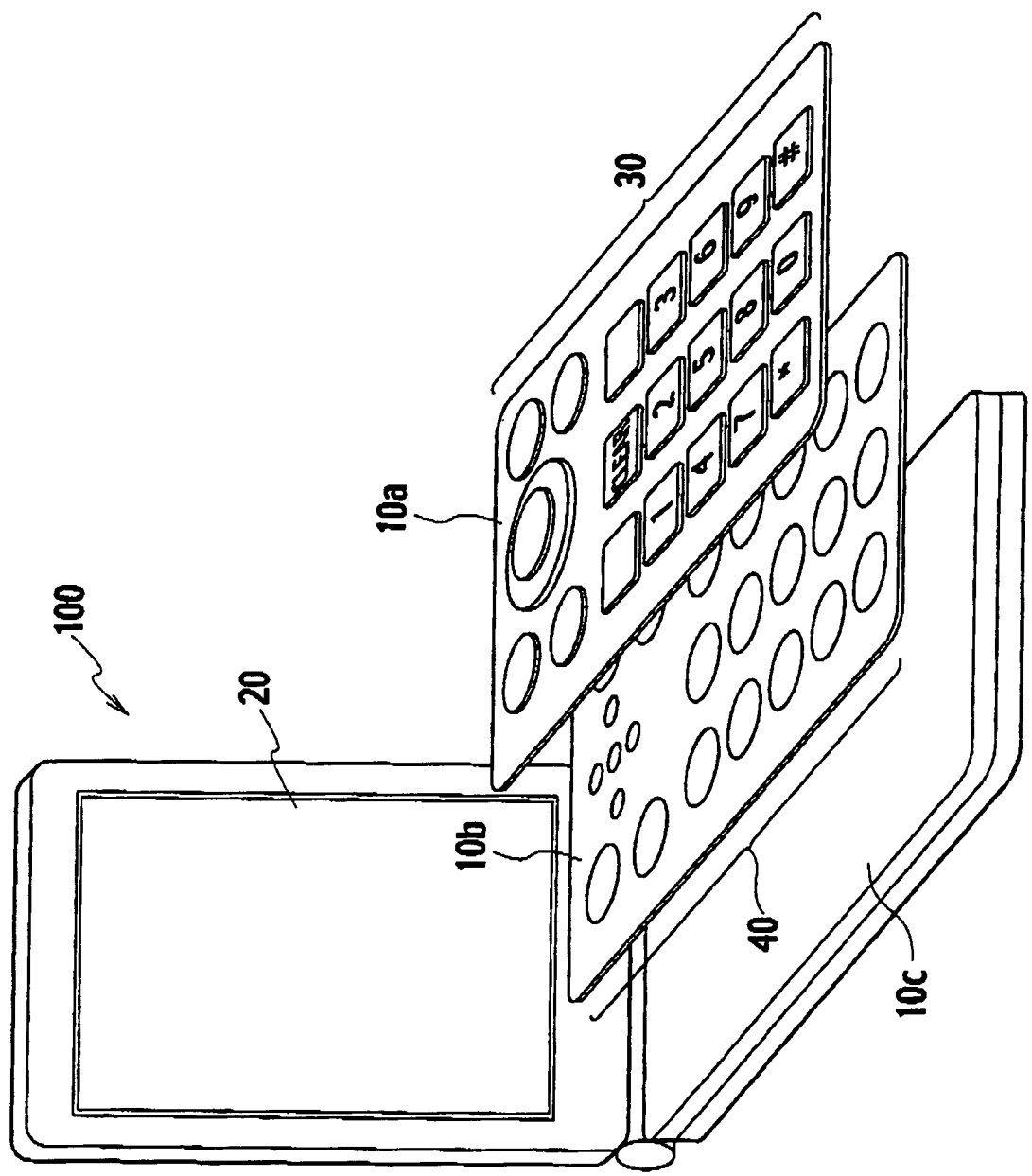
FIG. 2 is an exploded view showing the mobile terminal device 100 according to the first embodiment of the present invention.

FIG. 2 is an exploded view showing the mobile terminal device 100 according to the first embodiment of the present invention. As shown in FIG. 2, the main unit 10 includes a key-arranged surface 10a, a touch pad 10b, and a control board 10c.

The key-arranged surface 10a is a sheet member which supports the keys 30, and has a plurality of holes (not shown) in which the keys 30 are fitted.

The touch pad 10b detects the user touching a key 30, the key 30 being one of the keys 30. The touch pad 10b also detects the user touching the key-arranged surface 10a. The touch pad 10b can also detect the user keeping on touching the key 30.

The control board 10c controls the mobile terminal device 100 according to the result of detection by the touch pad 10b. Incidentally, the details of the control board 10c will be described later (see FIG. 3.)

(Configuration of Control Board)

Figure 3:
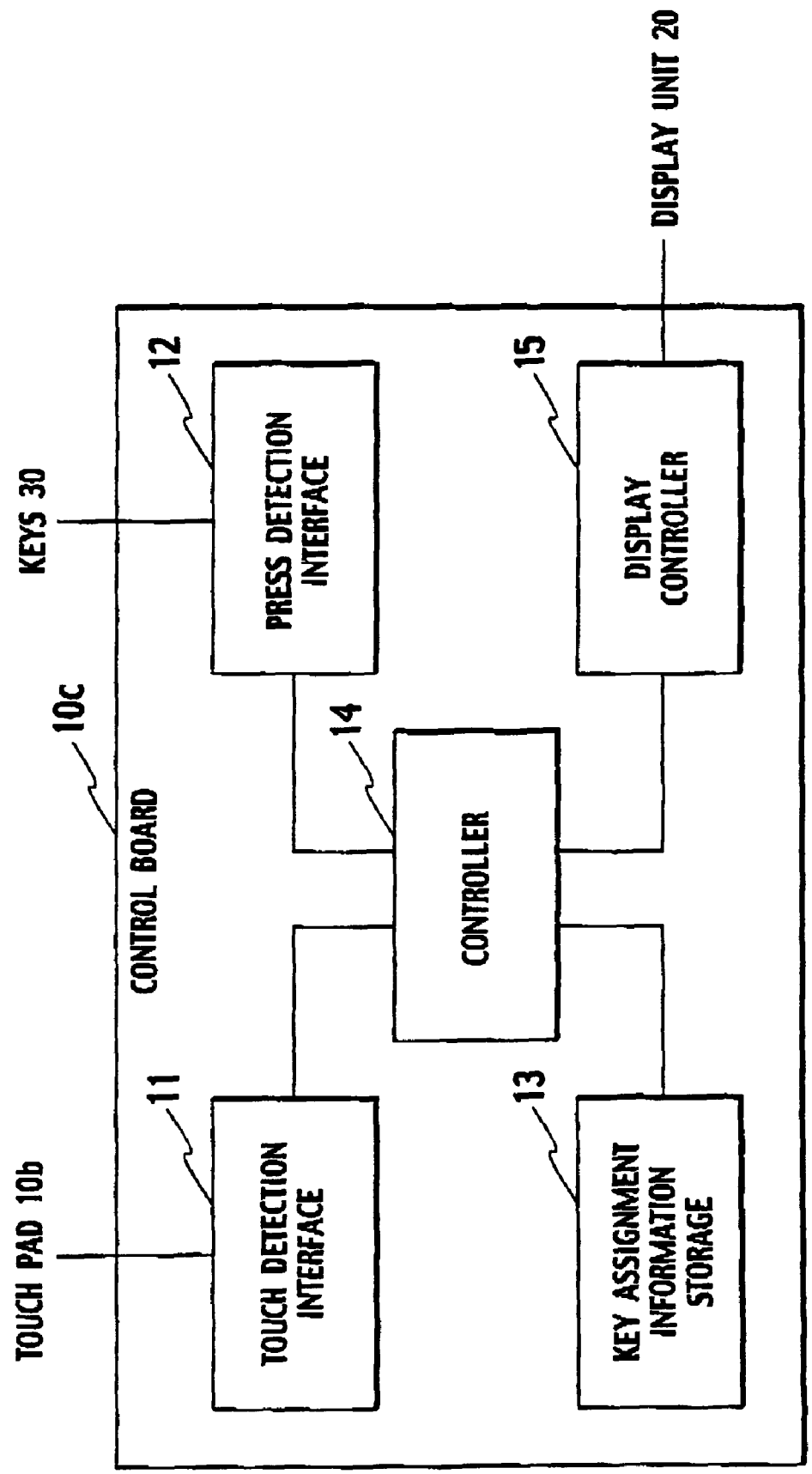
FIG. 3 is a block diagram showing a control board 10*c* according to the first embodiment of the present invention.

The description will be given below with reference to the drawing with regard to the configuration of the control board 10c mentioned above. FIG. 3 is a block diagram showing the control board 10c according to the first embodiment of the present invention.

As shown in FIG. 3, the control board 10c includes a touch detection interface 11, a press detection interface 12, a key assignment information storage section 13, a controller 14, and a display controller 15.

The touch detection interface 11 is connected to the touch pad 10b, and acquires a signal from the touch pad 10b, the signal indicating that the user has touched the key 30. In a case where the user continues touching the key 30, the touch detection interface 11 continues acquiring a signal from the touch pad 10b.

The press detection interface 12 is connected to each of the keys 30 and acquires a signal indicating that the user has pressed the key 30.

The key assignment information storage section 13 stores, as key assignment information, information associating the type of the key 30 with the characters assigned to each of the keys 30. Each of the keys 30 is assigned a plurality of characters. Incidentally, the details of the key assignment information will be described later (see FIG. 4.)

The controller 14 directs the display controller 15 to provide the screen display for character entry. As mentioned above, the screen for character entry is configured of the character entry region which receives entry of a character string, and the key information display region which provides display of the characters assigned to each of the keys 30.

The controller 14 directs the display controller 16 to provide sequential display of the characters as candidate characters assigned to the key 30 pressed by the user. The controller 14 converts the candidate character displayed on the display unit 20 to a finalized character when predetermined conditions of finalization are satisfied.

The display controller 15 controls the display unit 20 according to a directive command from the controller 14 so that the display unit 20 provides sequential display of the characters as the candidate characters assigned to the key 30. The display controller 15 also controls the display unit 20 so that the display unit 20 provides display of a character string finalized by the user.

(Key Assignment Information)

The description will be given below with reference to the drawing with regard to the key assignment information mentioned above. FIG. 4 is a table showing the key assignment information according to the first embodiment of the present invention.

As shown in FIG. 4, the key assignment information is the information associating the type of the key 30 with the characters assigned to each of the keys 30.

For example, the numeric key "1" is assigned a sequence of hiragana characters "a," "i," "u," "e," and "o," belonging to the "a" column of the Japanese kana syllabary. When the user presses the numeric key "1," one of the characters is displayed in turn in a sequence of "a," "i," "u," "e," and "o" as a candidate character.

(Character Entry Screen)

Figures 5A, 5B:
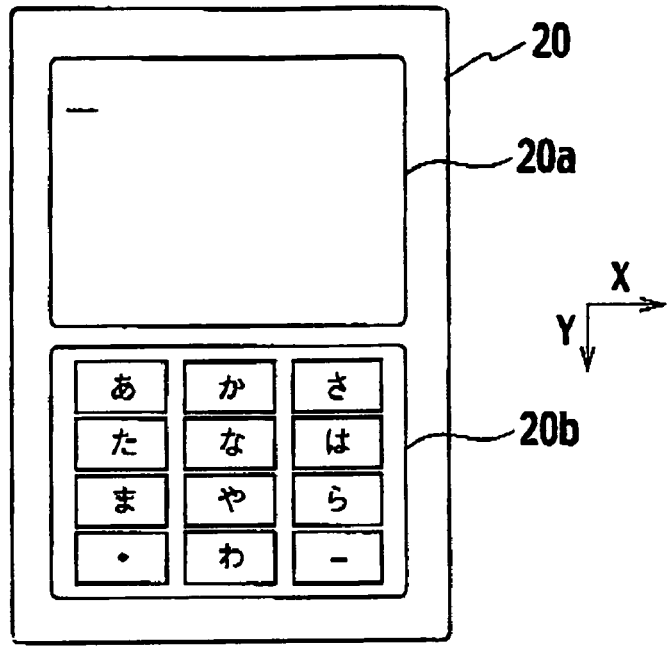
FIG. 5A is a plan view showing a character entry screen according to the first embodiment of the present invention.
FIG. 5B is a table showing coordinates on a key information display region according to the first embodiment of the present invention.

The description will be given below with reference to the drawings with regard to the character entry screen mentioned above. FIG. 5A is a plan view showing the character entry screen according to the first embodiment of the present invention. FIG. 5B is a table showing the coordinates on the key information display region according to the first embodiment of the present invention.

Firstly, the description will be given with regard to the character entry screen. As shown in FIG. 5A, the display unit 20 provides display of the character entry screen that is configured of a character entry region 20a and a key information display region 20b.

The character entry region 20a is the region that receives entry of a character string. Specifically, when the user presses the key 30 repeatedly, the character entry region 20a provides display of each of the characters in turn, as a candidate character, assigned to the pressed key 30. When predetermined conditions of finalization are satisfied, the character entry region 20a converts the candidate character displayed thereon to a finalized character.

The key information display region 20b is the region that provides display of the characters assigned to each of the keys 30. Specifically, the key information display region 20b provides display of the characters assigned to each of the keys 30 according to the layout of the keys 30. When the key information display region 20b is in its initial state (that is, the keys 30 are not in a pressed state by the user), the key information display region 20b provides display of the first one of the characters assigned to each of the keys 30.

For example, the key information display region 20b in its initial state provides display of the first one of the characters assigned to each of the numeric keys "0" to "9" and the symbol keys "*", and "#" according to the layout of the keys 30. Specifically, the first characters are hiragana characters "a," "ka," "sa," "ta," "na," "ha," "ma," "ya," "ra," and "wa," which are assigned to the numeric keys "1," "2," "3," "4," "5," "6," "7," "8," "9," and "0," respectively. The first characters include the character representing a voiced consonant and the character representing a long vowel, which are respectively assigned to the symbol keys "*" and "#." Incidentally, the hiragana character "a" is the first one of the characters belonging to the first, "a" column of the Japanese kane syllabary, and the hiragana character "ka," is the first one of the characters belonging to the second, "ka," column thereof. The same holds for the third, "sa," to the last, "wa," columns thereof.

Secondly, the description will be given with regard to the coordinates on the key information display region. As shown in FIG. 5B, the keys 30 are given the respective coordinates thereof on the display region. The X axis is the axis along which the X value is larger as viewed farther away from an upper end of the display unit 20 and closer to a lower end thereof. The Y axis is the axis along which the Y value is larger as viewed farther away from a left end of the display unit 20 and closer to a right end thereof.

For example, the characters assigned to the numeric key "1" (e.g., the hiragana character "a" in the initial state) located at the uppermost left of the main unit 10 are displayed in such a manner that the X value of each character lies between 0 and 70 inclusive and the Y value of the each character lies between 60 and 110 inclusive. Reversely, the characters assigned to the symbol key "#" (e.g., the character "-," in the initial state) located at the lowermost right of the main unit 10 are displayed in such a manner that the X value of each character lies between 160 and 230 inclusive and the Y value of each character lies between 240 and 290 inclusive.

(Operation of Mobile Terminal Device)

Figure 6:
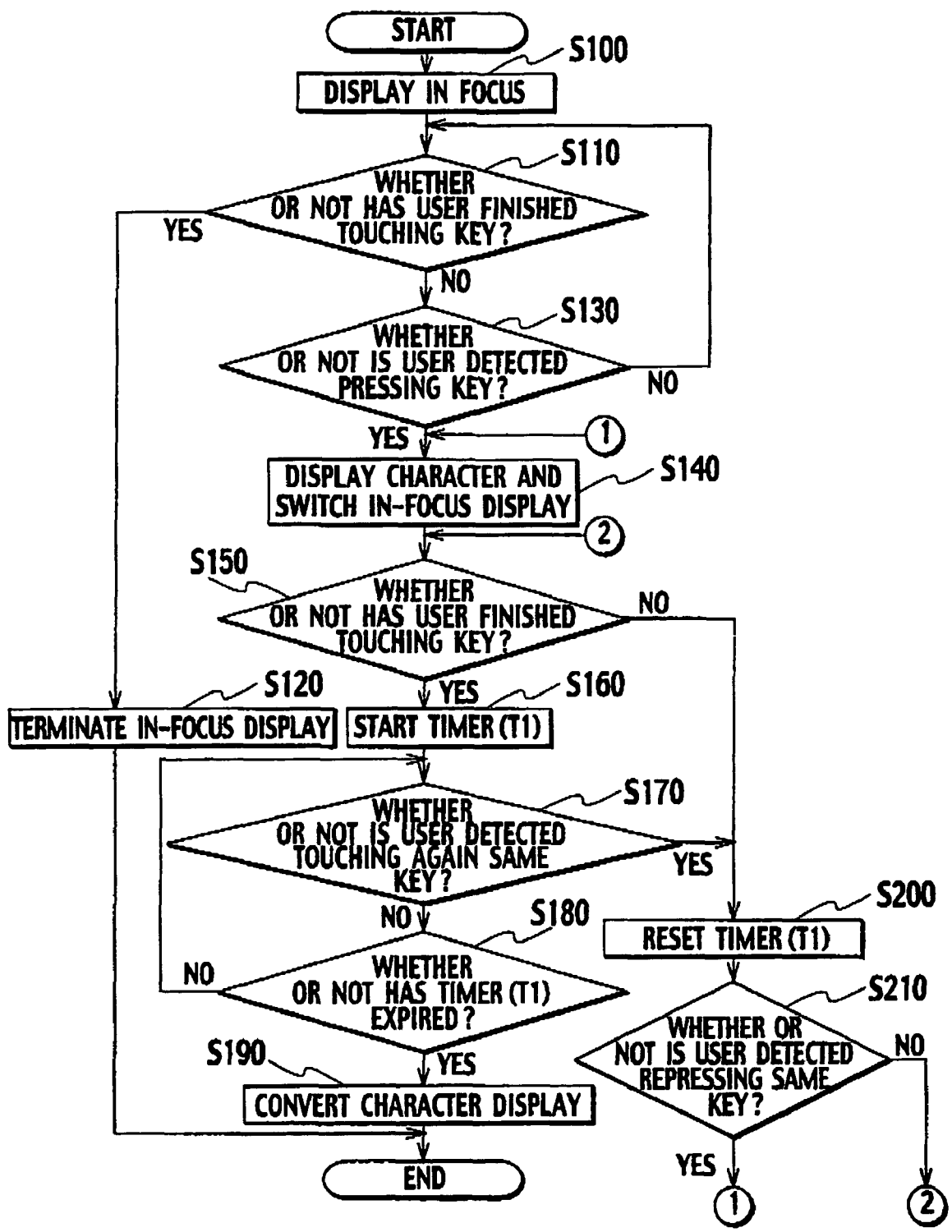
FIG. 6 is a flowchart showing the operation of the mobile terminal device 100 according to the first embodiment of the present invention.

The description will be given below with reference to the drawing with regard to the operation of the mobile terminal device 100 mentioned above. FIG. 6 is a flowchart showing the operation of the mobile terminal device 100 according to the first embodiment of the present invention. Incidentally, a flow shown in FIG. 6 shows processing which occurs when the user touches any of the keys 30 under a condition where the display unit 20 provides display of the character entry screen.

As shown in FIG. 6, at step S100, the mobile terminal device 100 provides in-focus display of the character assigned to the key 30 being touched by the user. Incidentally, the character displayed in focus on the key information display region 20b is the character, that is, a subsequent candidate character, which is to be displayed as the candidate character on the character entry region 20a in a case where the user presses the key 30.

For example, in a case where the user touches the numeric key "1," the mobile terminal device 100 provides in-focus display of the first one "a" of the hiragana characters assigned to the numeric key "1."

At step S110, the mobile terminal device 100 determines whether or not the user has finished touching the key 30. In a case where the mobile terminal device 100 determines that the user has finished touching the key 30, the processing goes to step S120. In a case where the mobile terminal device 100 determines that the user continues touching the key 30, the processing goes to step S130.

At step S120, the mobile terminal device 100 terminates the in-focus display of the character on the key information display region 20b.

At step S130, the mobile terminal device 100 determines whether or not the user is detected pressing the touched key 30. In a case where the mobile terminal device 100 determines that the user is detected pressing the key 30, the processing goes to step S140. In a case where the mobile terminal device 100 determines that the user is not detected pressing the key 30, the processing returns to step S110.

At step S140, the mobile terminal device 100 provides display so that the character entry region 20a provides display of the character, as the candidate character, assigned to the key 30 pressed by the user. Incidentally, the character displayed as the candidate character is the character currently displayed in focus on the key information display region 20b. The mobile terminal device 100 also switches a focused-display from the character currently displayed in focus on the key information display region 20b to a subsequent character.

For example, in a case where the user presses the numeric key "1," the mobile terminal device 100 provides display so that the character entry region 20a provides display of the hiragana character "a" as the candidate character, assigned to the numeric key "1." The mobile terminal device 100 also switches display from the hiragana character "a" displayed in focus on the key information display region 20b to the subsequent hiragana character "i."

At step S150, the mobile terminal device 100 determines whether or not the user has finished touching the key 30. In a case where the mobile terminal device 100 determines that the user has finished touching the key 30, the processing goes to step S160. In a case where the mobile terminal device 100 determines that the user continues touching the key 30, the processing goes to step S200.

At step S160, the mobile terminal device 100 starts a timer (T1) which counts the time till the time-out point for finalizing the candidate character displayed on the character entry region 20a. At step S170, the mobile terminal device 100 determines whether or not the user is detected touching again the same key 30 as the key 30 touched by the user at step S140. In a case where the mobile terminal device 100 determines that the user is detected touching again the same key 30, the processing goes to step S200. In a case where the mobile terminal device 100 determines that the user is not detected touching again the same key 30, the processing goes to step S180.

At step S180, the mobile terminal device 100 determines whether or not the timer (T1) has expired, that is, whether or not the time counted by the timer (T1) has come to a predetermined judging time. In a case where the mobile terminal device 100 determines that the timer (T1) has expired, the processing goes to step S190. In a case where the mobile terminal device 100 determines that the timer (T1) has not expired yet, the processing returns to step S170.

At step S190, the mobile terminal device 100 converts the candidate character displayed on the character entry region 20a to a finalized character.

At step S200, the mobile terminal device 100 resets the time being counted by the timer (T1).

At step S210, the mobile terminal device 100 determines whether or not the user is detected repressing the same key 30 as the key 30 pressed by the user at step S130. In a case where the mobile terminal device 100 determines that the user is detected repressing the same key 30, the processing returns to step S140. In a case where the mobile terminal device 100 determines that the user is not detected repressing the same key 30, the processing returns to step S160.

In a case where the user represses the same key 30, the mobile terminal device 100 switches display from the candidate character displayed on the character entry region 20a to the subsequent character and also switches a focused-display from the character currently displayed in focus on the key information display region 20b to the subsequent character, as mentioned above.

For example, in a case where the user represses the numeric key "1" as the same key 30, the mobile terminal device 100 switches display from the candidate hiragana character "a" displayed on the character entry region 20a to the subsequent hiragana character "i." The mobile terminal device 100 also switches a focused-display from the hiragana character "i," currently displayed in focus on the key information display region 20b to the subsequent hiragana character "U."

(Character Entry Screen)

The description will be given below with reference to the drawings with regard to how the character entry screen mentioned above makes a transition from one state to another.

FIGS. 7A to 7G are plan views showing how the character entry screen according to the first embodiment of the present invention makes the transition from one state to another.

Figure 7:
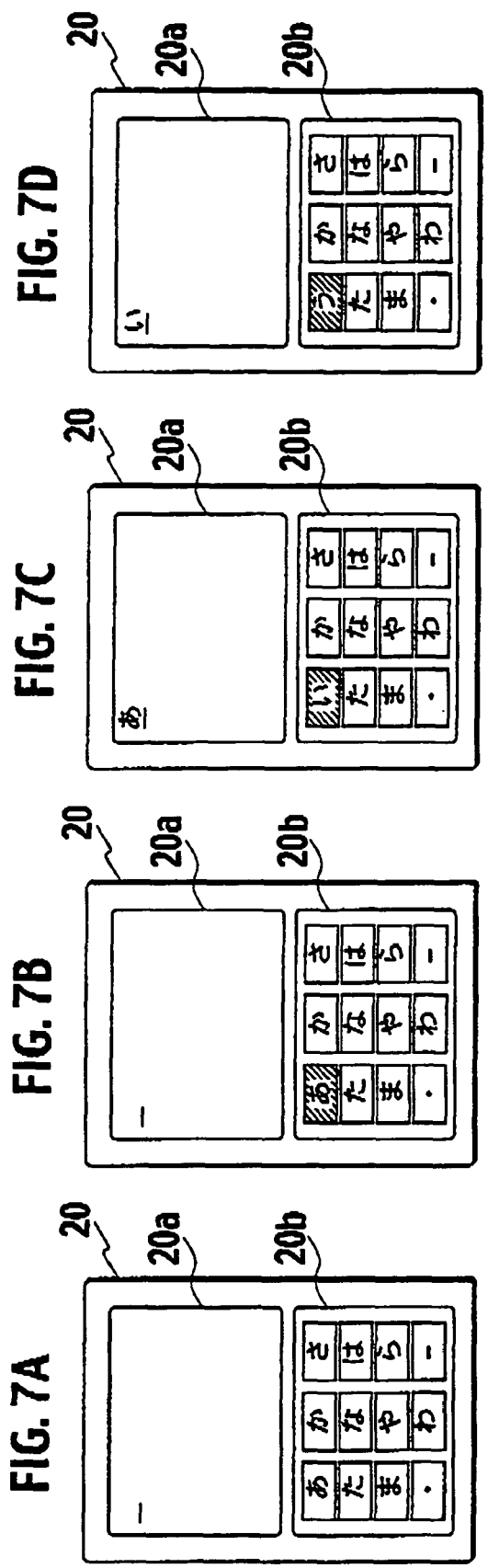
FIGS. 7A to 7G are plan views showing how the character entry screen according to the first embodiment of the present invention makes a transition from one state to another.

FIG. 7A shows the character entry screen which appears on the display unit 20 in a case where the user does not touch any of the keys 30, in the same status shown in FIG. 5A.

FIG. 7B shows the character entry screen which appears on the display unit 20 in a case where the user touches the numeric key "1" under a condition shown in FIG. 7A. Specifically, the key information display region 20b of the display unit 20 provides in-focus display of the first one "a" of the hiragana characters assigned to the numeric key "1."

FIG. 7C shows the character entry screen which appears on the display unit 20 in a case where the user presses the numeric key "1" under a condition shown in FIG. 7B. Specifically, the character entry region 20a of the display unit 20 provides display of the hiragana character "a" as a candidate character, which has been being displayed in focus on the key information display region 20b. Also, the key information display region 20b of the display unit 20 switches display from the hiragana character "a," which has been being displayed in focus, to the subsequent hiragana character "i," which is then displayed in focus on the key information display region 20b.

FIG. 7D shows the character entry screen which appears on the display unit 20 in a case where the user represses the numeric key "1" under a condition shown in FIG. 7C Specifically, the character entry region 20a of the display unit 20 switches display from the hiragana character "a," which has been being displayed as the candidate character, to the subsequent hiragana character "i." Also, the key information display region 20b of the display unit 20 switches display from the hiragana character "i," which has been being displayed in focus to the subsequent hiragana character "u," which is then displayed in focus on the key information display region 20b.

FIG. 7E shows the character entry screen which appears on the display unit 20 in a case where the timer (T1) expires after the user has finished touching the numeric key "1" under the condition shown in FIG. 7C Specifically, the hiragana character "a" which has been being displayed as the candidate character is finalized in the character entry region 20a of the display unit 20. Also, the key information display region 20b of the display unit 20 terminates the in-focus display of the hiragana character "i."

FIG. 7F shows the character entry screen which appears on the display unit 20 in a case where the user touches the numeric key "1" under a condition shown in FIG. 7E. Specifically, the key information display region 20b of the display unit 20 provides in-focus display of the first one "a" of the hiragana characters assigned to the numeric key "1," in the same status shown in FIG. 7B. The character entry region 20a of the display unit 20 continues providing display of the hiragana character "a," which is already finalized.

FIG. 7G shows the character entry screen which appears on the display unit 20 in a case where the user presses the numeric key "1" under a condition shown in FIG. 7F. Specifically, the character entry region 20a of the display unit 20 provides display of the hiragana character "a" as the candidate character, which has been being displayed in focus on the key information display region 20b. Also, the key information display region 20b of the display unit 20 switches display from the hiragana character "a" displayed in focus to the subsequent hiragana character "i," which is then displayed in focus on the key information display region 20b.

(Action and Effect)

In the mobile terminal device 100 according to the first embodiment of the present invention, the controller 14 converts the candidate character displayed on the character entry region 20a of the display unit 20 to a finalized character, in a case where a predetermined time period elapses and the judging time comes after the user finishes touching the key 30. Thus, the mobile terminal device 100 of the present invention can prevent an unintended candidate character from being converted to a finalized character, when the user moves one's finger off the key 30 in situations where the user changes one's grip to hold the mobile terminal device 100 or does the like, which may occur with the conventional mobile terminal device which converts the candidate character to a finalized character when the user moves one's finger off the key. Therefore, the mobile terminal device 100 of the present invention saves the user having to perform an additional operation for character finalization and thus facilitates user's operations for character entry.

[Second Embodiment]

A mobile terminal device according to a second embodiment of the present invention will be described below with reference to the accompanying drawings Hereinafter, difference from the above mentioned first embodiment will be mainly described.

Specifically, the second embodiment converts a candidate character displayed on the character entry region 20a to a finalized character when the user touches a different key 30 from the key 30 pressed by the user even before the timer (T1) expires, while the first embodiment mentioned above does not convert the candidate character to a finalized character until the timer (T1) expires.

(Operation of Mobile Terminal Device)

Figure 8:
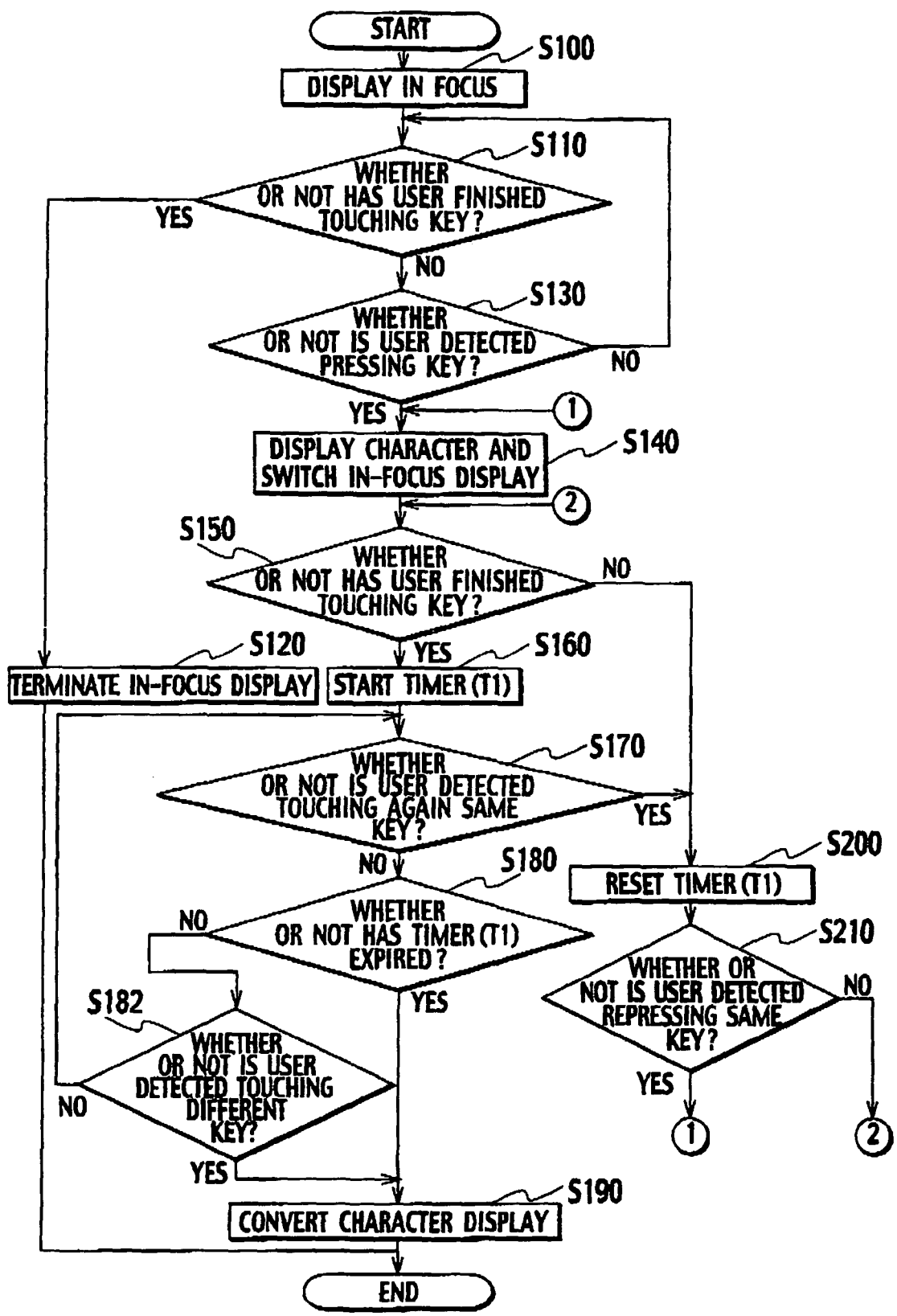
FIG. 8 is a flowchart showing the operation of the mobile terminal device 100 according to a second embodiment of the present invention.

The description will be given below with reference to the drawing with regard to the operation of the mobile terminal device 100 according to the second embodiment of the present invention. FIG. 8 is a flowchart showing the operation of the mobile terminal device 100 according to the second embodiment of the present invention. In FIG. 8, the same processing steps as those shown in the flowchart of FIG. 6 are designated by the same step numbers.

As shown in FIG. 8, at step S182, the mobile terminal device 100 determines whether or not the user is detected touching a different key 30 from the key 30 pressed by the user at step S140. In a case where the mobile terminal device 100 determines that the user is detected touching the different key 30, the processing goes to step S190. In a case where the mobile terminal device 100 determines that the user is not detected touching the different key 30, the processing returns to step S170.

As mentioned above, the mobile terminal device 100 converts the candidate character displayed on the character entry region 20a to a finalized character in a case where the user is detected touching the different key 30 even before the timer (T1) expires.

In the second embodiment, the mobile terminal device 100 converts the candidate character displayed on the character entry region 20a to a finalized character also at the expiry of the timer (T1). However, it is to be understood that the present invention is not limited to the embodiment described herein. Specifically, the mobile terminal device 100 may convert the candidate character displayed on the character entry region 20a to a finalized character only in a case where the user is detected touching the different key 30.

(Action and Effect)

In the mobile terminal device 100 according to the second embodiment of the present invention, the controller 14 converts the candidate character displayed on the character entry region 20a of the display unit 20 to a finalized character, in a case where the user intentionally touches the different key 30. Thus, the mobile terminal device 100 of the present invention can prevent an unintended candidate character from being converted to a finalized character when the user moves one's finger off the key 30 in situations where the user changes one's grip to hold the mobile terminal device 100 or does the like, which may occur with the conventional mobile terminal device which converts the candidate character to a finalized character when the user moves one's finger off the key.

Moreover, the controller 14 converts the candidate character displayed on the character entry region 20a of the display unit 20 to a finalized character in a case where the user touches the different key 30 even before the timer (T1) expires. Thus, the mobile terminal device 100 of the present invention enables quicker character entry.

[Third Embodiment]

A mobile terminal device according to a third embodiment of the present invention will be described below with reference to the accompanying drawings. Hereinafter, difference from the above mentioned first embodiment will be mainly described.

Specifically, the third embodiment converts a candidate character displayed on the character entry region 20a to a finalized character when the user touches a particular corresponding region, which is the region including at least a part of the key 30 pressed by the user, even before the timer (T1) expires, while the first embodiment mentioned above does not convert the candidate character to a finalized character until the timer (T1) expires.

(Particular Corresponding Region)

The description will be given below with reference to the drawings with regard to the particular corresponding region according to the third embodiment of the present invention. FIGS. 9A to 9C are plan views showing the particular corresponding regions according to the third embodiment of the present invention.

As shown in FIGS. 9A to 9C, each key 30 is provided with a particular corresponding region including at least a part thereof. Preferably, the particular corresponding region is provided with a region which the user will not touch easily when pressing the key 30.

As shown as an example in FIG. 9A, for example, an upper left region of may be associated, as the particular corresponding region with the key 30. As shown as another example in FIG. 9B, a region including the upper left region of the key 30 and also projecting toward upper left beyond may be associated, as the particular corresponding regions with the key 30. As shown as still another example in FIG. 9C, the upper left and upper right regions of may be associated, as the particular corresponding regions with the key 30.

(Coordinates of Key-Arranged Positions)

The description will be given below with reference to the drawing with regard to the coordinates of the key-arranged positions according to the third embodiment of the present invention. FIG. 10 is a table showing the coordinates of the key-arranged positions according to the third embodiment of the present invention. As employed herein, the coordinates of the key-arranged positions refer to the coordinates representing the layout positions of the keys 30 provided on the main unit 10.

As shown in FIG. 10, the keys 30 are given the coordinates thereof and the coordinates of the respective particular corresponding regions thereof. FIG. 10, shows the coordinates of the particular corresponding regions shown in FIG. 9C mentioned above.

For example, the numeric key "1" located at the uppermost left of the main unit 10 is arranged in such a manner that the X value lies between 0 and 100 inclusive and the Y value lies between 0 and 60 inclusive. The numeric key "1" is provided with a particular corresponding region (at the left) such that the X value lies between 0 and 40 inclusive and the Y value lies between 0 and 20 inclusive and a particular corresponding region (at the right) such that the X value lies between 60 and 100 inclusive and the Y value lies between 0 and 20 inclusive.

The coordinates of the key-arranged positions are stored in, for example, the key assignment information storage section 13. The coordinates of the keys 30 cannot be overwritten, but the coordinates of the particular corresponding regions of the keys 30 can be overwritten by the user's operation on the keys 30. Specifically, the user sets (or customizes) the positions, sizes and number of the particular corresponding regions by overwriting the coordinates of the particular corresponding regions (i.e., FLXmin, FLXmax, FLYmin, FLYmax, FRXmin, FRXmax, FRYmin, and FRYmax).

(Operation of Mobile Terminal Device)

Figure 11:
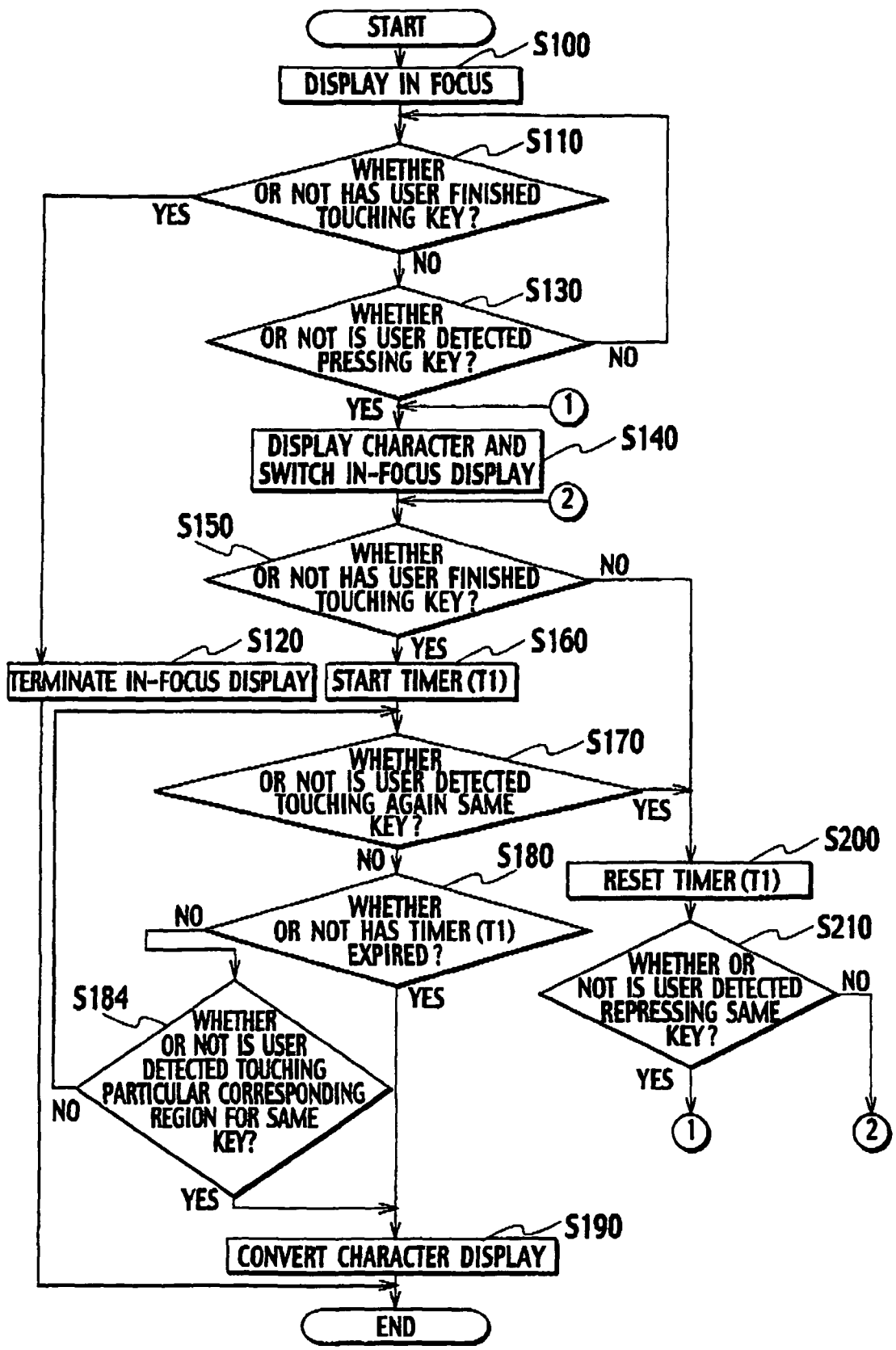
FIG. 11 is a flowchart showing the operation of the mobile terminal device 100 according to the third embodiment of the present invention.

The description will be given below with reference to the drawing with regard to the operation of the mobile terminal device 100 according to the third embodiment of the present invention. FIG. 11 is a flowchart showing the operation of the mobile terminal device 100 according to the third embodiment of the present invention. In FIG. 11, the same processing steps as those shown in the flowchart of FIG. 6 are designated by the same step numbers.

As shown in FIG. 11, at step S184, the mobile terminal device 100 determines whether or not the user is detected touching the particular corresponding region provided for the same key 30 as the key 30 pressed by the user at step S140. In a case where the mobile terminal device 100 determines that the user is detected touching the particular corresponding region provided for the same key 30, the processing goes to step S190. In a case where the mobile terminal device 100 determines that the user is not detected touching the particular corresponding region provided for the same key 30, the processing returns to step S170.

As mentioned above, the mobile terminal device 100 converts the candidate character displayed on the character entry region 20a to a finalized character in a case where the user is detected touching the particular corresponding region provided for the same key 30 even before the timer (T1) expires.

In the third embodiment, the mobile terminal device 100 converts the candidate character displayed on the character entry region 20a to a finalized character also at the expiry of the timer (T1). However, the present invention is not limited to the embodiment described herein. Specifically, the mobile terminal device 100 may convert the candidate character displayed on the character entry region 20a to a finalized character only in a case where the user is detected touching the particular corresponding region provided for the same key 30.

In the third embodiment, the mobile terminal device 100 converts the candidate character displayed on the character entry region 20a to a finalized character in a case where the user is detected touching the particular corresponding region provided for the key 30 after the user has been detected pressing the key 30. However, it is to be understood that the present invention is not limited to the embodiment described herein. Specifically, the mobile terminal device 100 may convert the candidate character displayed on the character entry region 20a to a finalized character in a case where the user is detected touching the particular corresponding region provided for the key 30 while the key 30 is down.

(Action and Effect)

In the mobile terminal device 100 according to the third embodiment of the present invention, the controller 14 converts the candidate character displayed on the character entry region 20a of the display unit 20 to a finalized character, in a case where the user intentionally touches the particular corresponding region provided for the same key 30. Thus, the mobile terminal device 100 of the present invention can prevent an unintended candidate character from being converted to a finalized character when the user moves one's finger off the key 30 in situations where the user changes one's grip to hold the mobile terminal device 100 or does the like, which may occur with the conventional mobile terminal device which converts the candidate character to a finalized character when the user moves one's finger off the key.

Moreover, the controller 14 converts the candidate character displayed on the character entry region 20a of the display unit 20 to a finalized character in a case where the user touches the particular corresponding region provided for the same key 30 even before the timer (T1) expires. Thus, the mobile terminal device 100 of the present invention enables quicker character entry.

Furthermore, the coordinates of the key-arranged positions are stored in, for example, the key assignment information storage section 13, and the coordinates of the particular corresponding regions of the keys 30 can be overwritten by the user's operation on the keys 30. Thus, the mobile terminal device 100 of the present invention enables the user to easily customize the positions, sizes and number of the particular corresponding regions.

[Fourth Embodiment]

A mobile terminal device according to a fourth embodiment of the present invention will be described below with reference to the accompanying drawings. Hereinafter, difference from the above mentioned third embodiment will be mainly described.

Specifically, the fourth embodiment converts a candidate character displayed on the character entry region 20a to a finalized character when the user touches the key-arranged surface 10a somewhere thereon (specifically on a finalization region thereon) except for the key 30 pressed by the user, while the third embodiment mentioned above converts the candidate character to a finalized character when the user touches the particular corresponding region including at least a part of the key 30 pressed by the user.

(Finalization Region)

The description will be given below with reference to the drawings with regard to the finalization region according to the fourth embodiment of the present invention. FIGS. 12 and 13 are plan views showing examples of the finalization region according to the fourth embodiment of the present invention.

As shown in FIGS. 12 and 13, each of the keys 30 is provided with a finalization region which is a portion on the key-arranged surface 10a, but excluding each key 30 itself. As shown as an example in FIG. 12, the finalization region can be provided for each key 30 on its periphery. Alternatively, as shown in FIG. 13, the finalization region may be provided with the entire area of the key-arranged surface 10a, but excluding the keys 30.

As mentioned above, the finalization region may be a common region to every key 30, provided that the region includes at least a part of the key-arranged surface 10a except for the keys 30.

(Action and Effect)

In the mobile terminal device 100 according to the fourth embodiment of the present invention, the finalization region, which serves to convert the candidate character displayed on the character entry region 20a of the display unit 20 to a finalized character, is provided on or around the periphery of the key 30 pressed by the user. This enables the user to easily touch the finalization region simply by intentionally sliding one's finger over the pressed key 30. In other words, the mobile terminal device 100 of the present invention can prevent an unintended candidate character from being converted to a finalized character when the user moves one's finger off the key 30 in situations where the user changes one's grip to hold the mobile terminal device 100 or does the like, which may occur with the conventional mobile terminal device which converts the candidate character to a finalized character when the user moves one's finger off the key 30.

[Fifth Embodiment]

A mobile terminal device according to a fifth embodiment of the present invention will be described below with reference to the accompanying drawings. Hereinafter, difference from the above mentioned first embodiment will be mainly described.

Specifically, the fifth embodiment rejects a process based on the press of a given key (e.g., a cursor key as employed in the fifth embodiment) over a predetermined period of time after finalizing a candidate character displayed on the character entry region 20a, while the above description of the first embodiment contains no particular mention of what follows after the process of finalizing the candidate character displayed on the character entry region 20a (i.e., the process at step S190).

Incidentally, the process based on the press of the given key, as employed in the fifth embodiment, refers to the process of finalizing the candidate character displayed on the character entry region 20a.

(Operation of Mobile Terminal Device)

Figure 14:
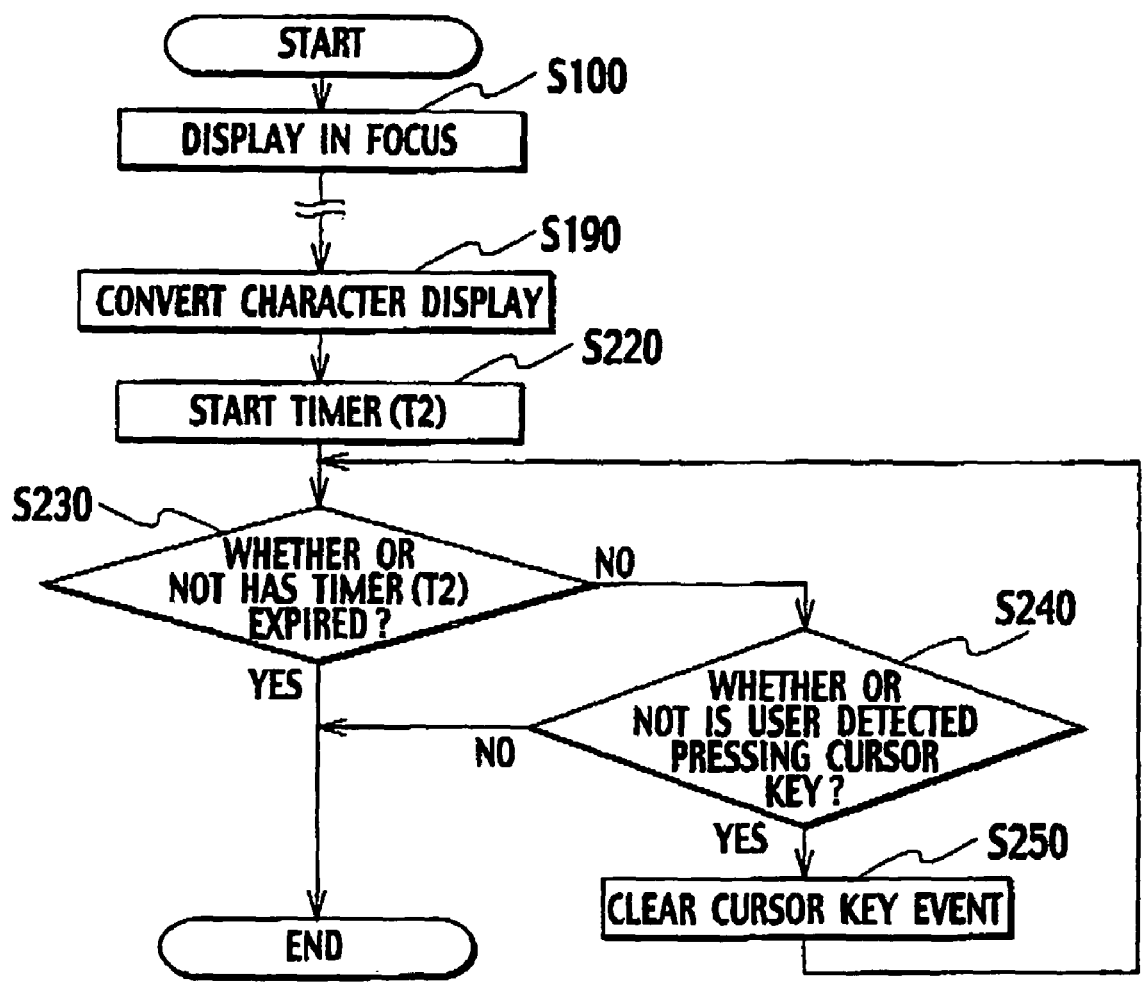
FIG. 14 is a flowchart showing the operation of the mobile terminal device 100 according to a fifth embodiment of the present invention.

The description will be given below with reference to the drawing with regard to the operation of the mobile terminal device 100 according to the fifth embodiment of the present invention. FIG. 14 is a flowchart showing the operation of the mobile terminal device 100 according to the fifth embodiment of the present invention. In FIG. 14, the same processing steps as those shown in the flowchart of FIG. 6 are designated by the same step numbers Steps S110 to S180 and steps S200 and S210 are omitted from FIG. 14, since the processes (specifically the processes between steps S100 and S210 inclusive) prior to finalizing the candidate character displayed on the character entry region 20a are the same as those shown in the flowchart of FIG. 6.

As shown in FIG. 14, at step S220, the mobile terminal device 100 starts a timer (T2) which runs for a period of time during which the process based on the press of the cursor key is rejected.

At step S230, the mobile terminal device 100 determines whether or not the timer (T2) has expired, that is, whether or not the time counted by the timer (T2) has come to a predetermined judging time. In a case where the mobile terminal device 100 determines that the timer (T2) has expired, the processing is brought to an end. In a case where the mobile terminal device 100 determines that the timer (T2) has not expired yet, the processing goes to step S240.

At step S240, the mobile terminal device 100 determines whether or not the user is detected pressing the cursor key. In a case where the mobile terminal device 100 determines that the user is detected pressing the cursor key, the processing goes to step S250. In a case where the mobile terminal device 100 determines that the user is not detected pressing the cursor key, the processing returns to step S230.

At step S250, the mobile terminal device 100 clears the process based on the press of the cursor key, that is, the process of finalizing the candidate character displayed on the character entry region 20*a* (or the process of moving a cursor).

As mentioned above, the mobile terminal device 100 rejects the process based on the press of the cursor key over the predetermined period of time after finalizing the candidate character displayed on the character entry region 20*a*.

(Action and Effect)

In the mobile terminal device 100 according to the fifth embodiment of the present invention, the controller 14 rejects the process based on the press of the cursor key over the predetermined period of time after finalizing the candidate character displayed on the character entry region 20*a*. Thus, the mobile terminal device 100 of the present invention avoids duplication of the process of finalizing the candidate character, even in a case where the user presses the cursor key in order to convert the candidate character, which has been already converted to a finalized character. Moreover, the mobile terminal device 100 of the present invention can prevent unintended movement of the cursor, even in a case where the user presses the cursor key, which has the function of moving the cursor as well as the function of finalizing the candidate character.

[Examples of Modifications]

There may be provided a program which causes a computer to execute the operation of the mobile terminal device 100 according to any one of the first to fifth embodiments of the present invention.

In the first to fifth embodiments, the touch pad 10*b* merely detects the user touching the key 30. However, it is to be understood that the present invention is not limited to these embodiments. The touch pad 10*b* may be designed to not only detect the user touching the key 30 but also to detect the user pressing the key 30.

In the first to third embodiments, the operation of the mobile terminal device 100 is based on interrupt processing for which detection by the touch pad 10*b* acts as a trigger. However, it is to be understood that the present invention is not limited to these embodiments. The operation of the mobile terminal device 100 may involve polling or loop processing which is executed at time intervals long enough to monitor user's operation.

[Sixth Embodiment]

(Configuration of Mobile Terminal Device)

Figure 15:
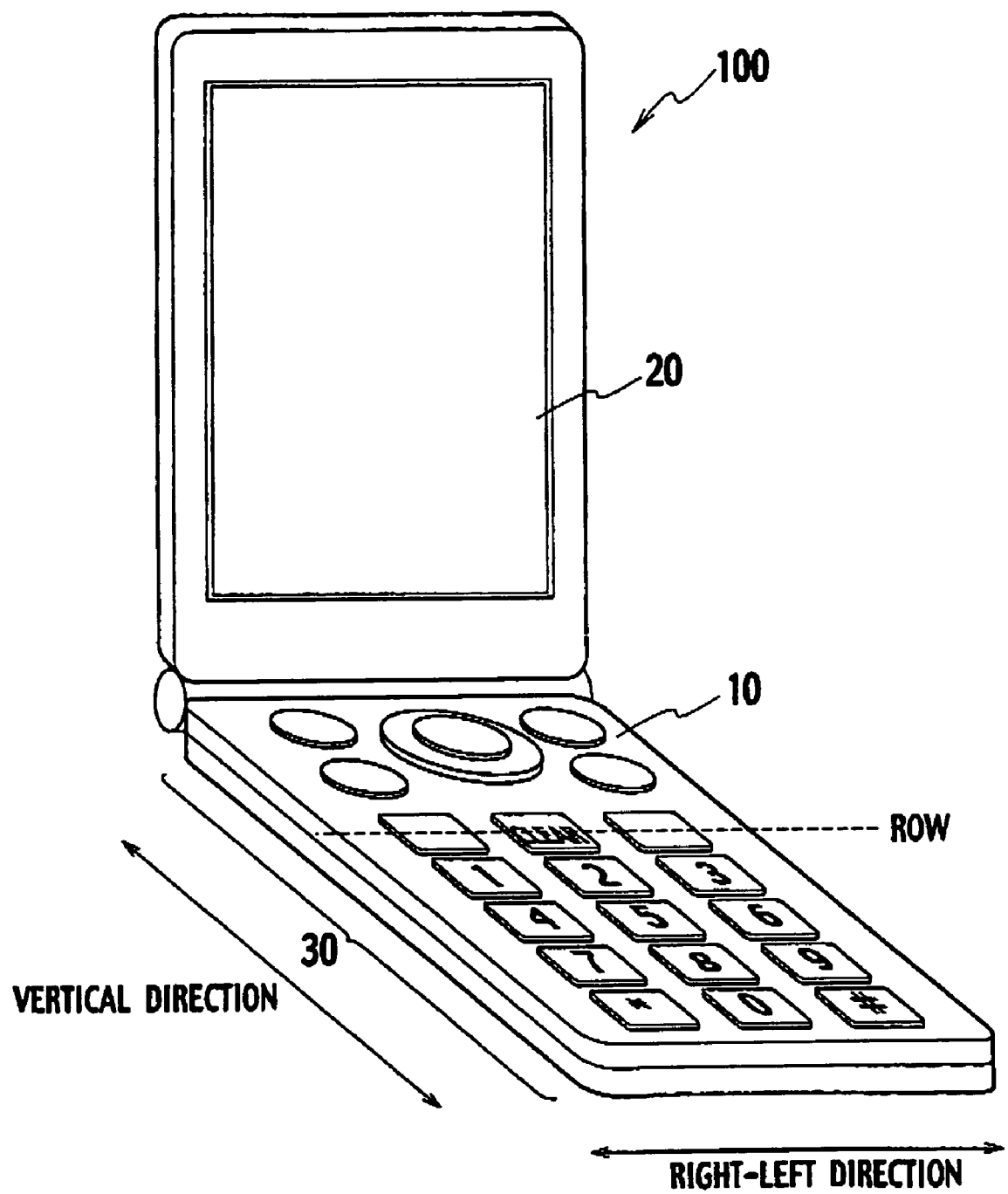
FIG. 15 is an external view showing a mobile terminal device 100 according to a sixth embodiment of the present invention.

With reference to the drawings, descriptions will be provided below for a configuration of a mobile terminal device according to a sixth embodiment of the present invention. FIG. 15 is an external view showing a mobile terminal device 100 according to the sixth embodiment of the present invention.

As shown in FIG. 15, the mobile terminal device 100 has a main unit 10 and a display unit 20. A plurality of keys 30 are provided in the main unit 10. Note that the keys 30 refer to keys such as "0" to "9," "*," "clear," and software keys. The respective keys 30 are arranged so as to form a plurality of rows each extending in the right-left direction of the mobile terminal device 100. The respective rows are arranged in the vertical direction of the mobile terminal device 100.

The main unit 10 has a control board 10*c* to be described later, and executes functions assigned to the keys 30 which are pressed. Incidentally, the functions include a function of entering characters, a speed dial function, a function of calling various screens, a function of activating various applications, a function of outputting various contents, and the like.

In the display unit 20, explanations on the respective functions and the like are displayed. In the display unit 20, various screens called by the functions, various applications activated by the functions, and the like are displayed.

Figure 16:
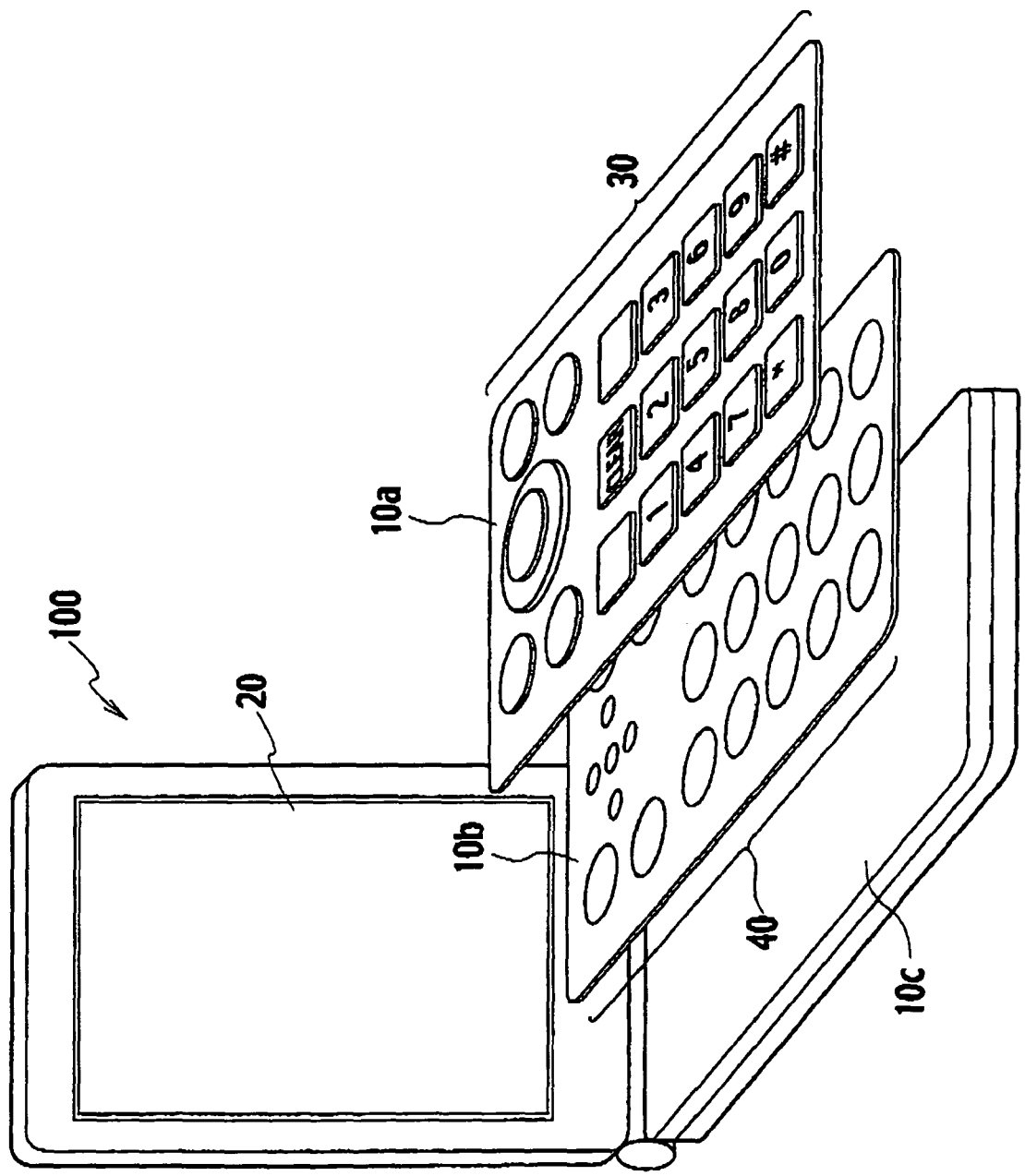
FIG. 16 is an exploded view showing the mobile terminal device 100 according to the sixth embodiment of the present invention.

FIG. 16 is an exploded view showing the mobile terminal device 100 according to the sixth embodiment of the present invention. As shown in FIG. 16, the main unit 10 includes a key-arranged surface 10*a*, a touch pad 10*b* and the control board 10*c*.

The key-arranged surface 10*a* is a sheet member for holding the keys 30, and includes a plurality of holes (not shown) in which the keys 30 fit.

The touch pad 10*b* detects touches on the respective keys 30 by a user. Incidentally, the touches on the plurality of keys by the user are also detected with the touch pad 10*b*. For example, a discrete type touch pad is used as the touch pad 10*b*.

The control board 10*c* controls the mobile terminal device 100 according to a result of the detection by the touch pad 10*b*. Details of the control board 10*c* will be described later (see FIG. 17).

(Configuration of Control Board)

Figure 17:
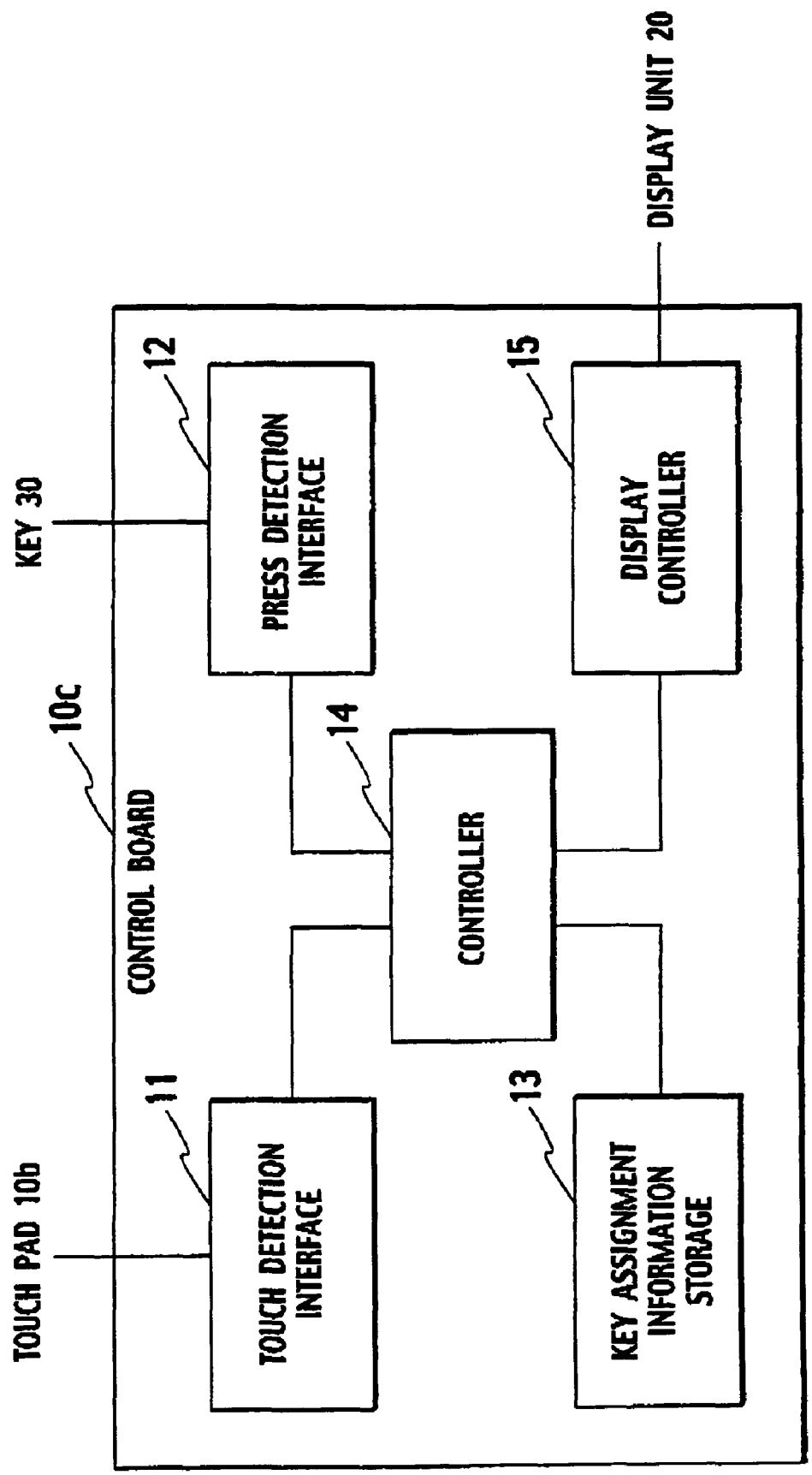
FIG. 17 is a block diagram showing a control board 10c according to the sixth embodiment of the present invention.

With reference to the drawings, description will be provided below for a configuration of the control board 10*c* described above. FIG. 17 is a block diagram showing the control board 10*c* according to the sixth embodiment of the present invention.

As shown in FIG. 17, the control board 10*c* includes a touch detection interface 11, a press detection interface 12, a key assignment information storage 13, a controller 14 and a display controller 15.

The touch detection interface 11 is connected to the touch pad 10*b*, and is configured to obtain, from the touch pad 10*b*, a signal indicating that the user has touched the respective keys 30.

The press detection interface 12 is connected to each of the respective keys 30, and is configured to obtain a signal indicating that the user has pressed the respective keys 30.

The key assignment information storage 13 stores, as key assignment information, information which respectively associates types of the keys 30 with functions assigned to the respective keys 30. Details of the key assignment information will be described later (see FIG. 18).

The controller 14 specifies the keys 30 touched by the user as effective contact keys. Specifically, in a case where the user touches one of the keys 30, the controller 14 specifies that key 30 as the effective contact key. In a case where the user touches more than one key 30, the controller 14 specifies one of the plurality of keys 30 touched by the user as the effective contact key on the bases of key specification criteria set according to arrangement of the keys 30.

In the sixth embodiment, the key specification criteria described above are those based on which, in a case where there is one key 30 which is located in the uppermost row (hereinafter referred to as an upper contact key) among the keys 30 touched by the user, the upper contact key is set as the effective contact key.

According to the type of the key 30 specified as the effective contact key, the controller 14 instructs the display controller 15 to change a display of the function assigned to the key 30. Furthermore, according to the type of the key 30 pressed by the user, the controller 14 executes the function assigned to the key 30.

The display controller 15 changes the display related to the functions assigned to the keys 30. Incidentally, the explanations on the functions include character strings, icons and the like, which indicate types of the functions. In the sixth embodiment, changing of the displays related to the functions refers to a concept that all of the explanation on the functions assigned to the respective keys 30 are previously displayed, and that the explanation on the function, which is assigned to the key 30 touched by the user, is displayed in a state of being focused. In addition, changing of the displays related to the functions refers to a concept that the explanations on the functions assigned to the respective keys 30 are not previously displayed, and that the explanation on the function, which is assigned to the key 30 touched by the user, is newly displayed.

(Key Assignment Information)

Figures 18, 19:
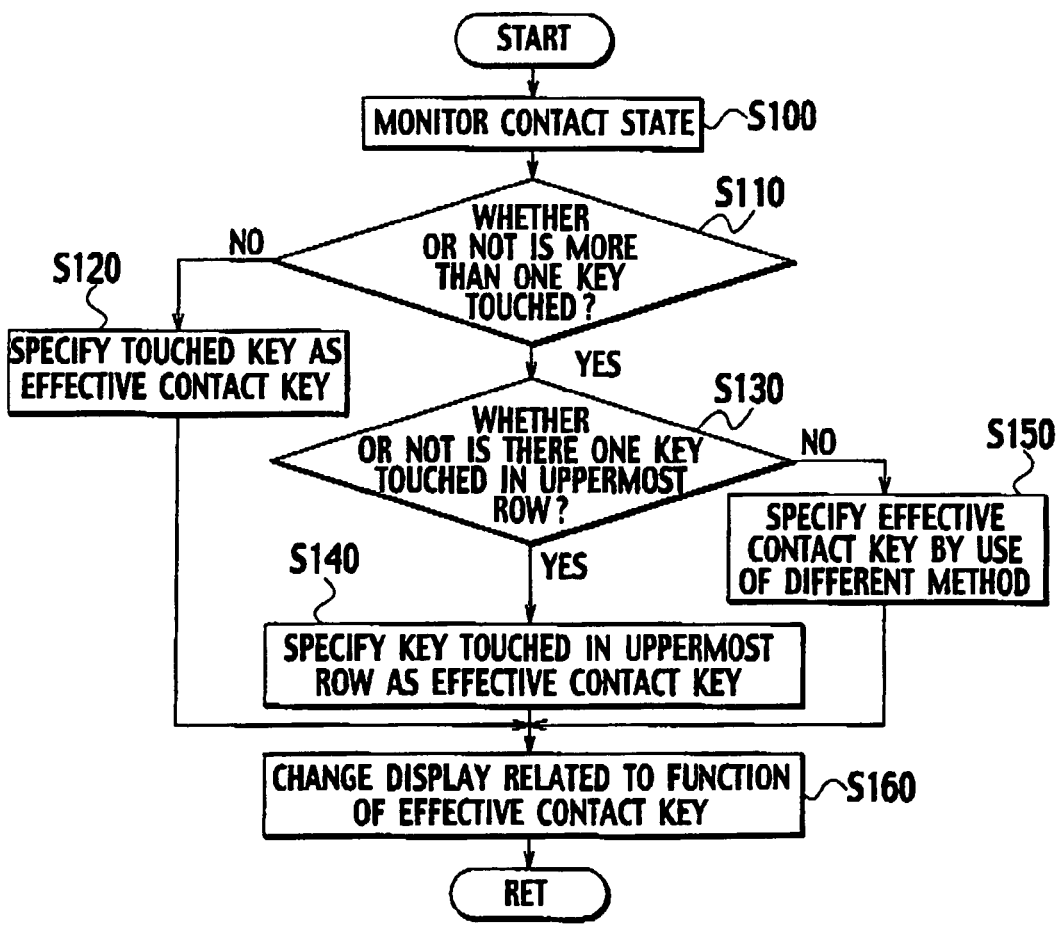
FIG. 18 is a table showing key assignment information according to the sixth embodiment of the present invention.
FIG. 19 is a flowchart showing operations of the mobile terminal device 100 according to the sixth embodiment of the present invention.

With reference to the drawings, the foregoing key assignment information will be described below. FIG. 18 is a table showing the key assignment information according to the sixth embodiment of the present invention.

As shown in FIG. 18, the key assignment information is information for respectively associating the types of the keys 30 with the functions assigned to the respective keys 30. For example, a function of calling a mail edit screen is assigned to a "1" key, and a function of connecting to a network is assigned to a "2" key.

(Operations of Mobile Terminal Device)

With reference to the drawings, operations of the above-described mobile terminal device 100 will be described below. FIG. 19 is a flowchart showing the operations of the mobile terminal device 100 according to the sixth embodiment of the present invention.

As shown in FIG. 19, in Step S100, the mobile terminal device 100 monitors a state of the user touching the keys 30.

In Step 110, the mobile terminal device 100 determines whether or not there is more than one key 30 touched by the user. The mobile terminal device 100 proceeds to processing of Step S120 in a case where the user touches one key 30, and proceeds to processing of Step S130 in a case where the user touches more than one key 30.

In Step S120, the mobile terminal device 100 specifies the key 30 touched by the user as the effective contact key.

In Step S130, the mobile terminal device 100 determines whether or not there is one key 30 located in the uppermost row (the upper contact key) among the keys 30 touched by the user The mobile terminal device 100 proceeds to processing of Step S140 in a case where there is one upper contact key, and proceeds to processing of Step S150 in a case where there is more than one upper contact key.

In Step S140, the mobile terminal device 100 specifies the key 30 located in the uppermost row (the upper contact key) as the effective contact key.

In Step S150, the mobile terminal device 100 specifies the effective contact key by use of a different method. The different methods include methods described in seventh to ninth embodiments to be described later.

In Step S160, the mobile terminal device 100 changes the display related to a function which is assigned to the key 30 specified as the effective contact key.

(Display Screen)

With reference to the drawings, screens displayed in the foregoing display unit 20 will be described below. FIGS. 20 to 23 are views showing examples of screens displayed in the display unit 20 according to the sixth embodiment of the present invention. In the sixth embodiment, all of the explanations on functions, which are assigned to the respective keys 30 (the keys "1" to "9"), are previously displayed, and the explanation on the function, which is assigned to the key 30 touched by the user, is displayed in a state of being focused.

Figure 20:
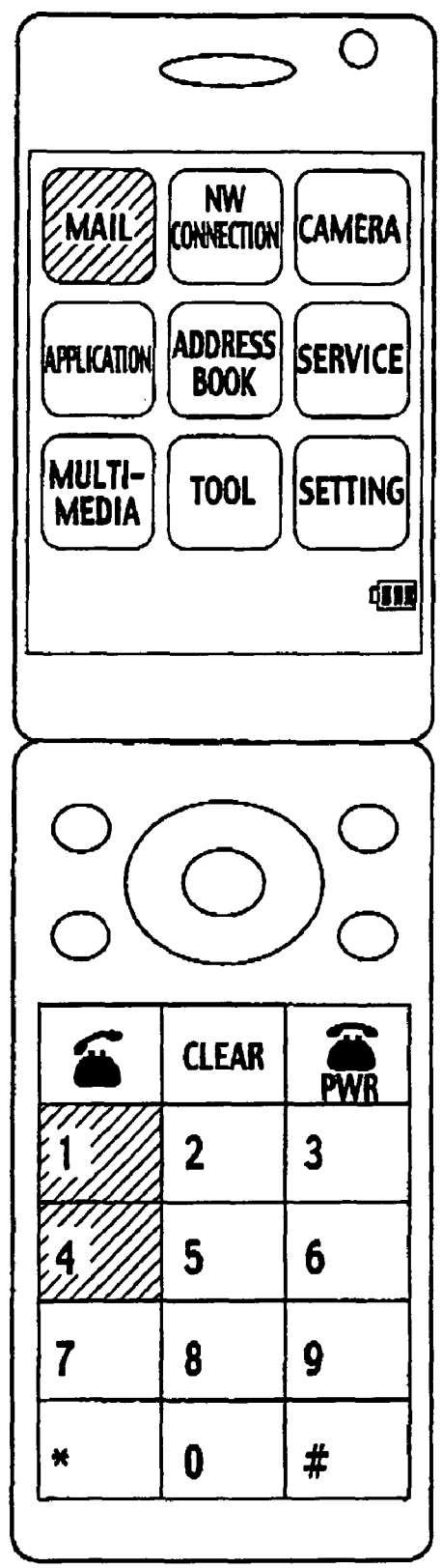
FIG. 20 is a view (part 1) showing a screen displayed on a display unit 20 according to the sixth embodiment of the present invention.

As shown in FIG. 20, in a case where the user touches the keys "1" and "4," the explanation on a function which is assigned to the "1" key arranged in the uppermost row among the keys 30 touched by the user, in other words, the explanation on the function of calling a mail edit screen (the character string "MAIL") is displayed in a state of being focused.

As described above, in a case where there is one key 30 which is located in the uppermost row (the upper contact key) among the keys 30 touched by the user, the explanation on a function assigned to the upper contact key is displayed in a state of being focused.

Figure 21:
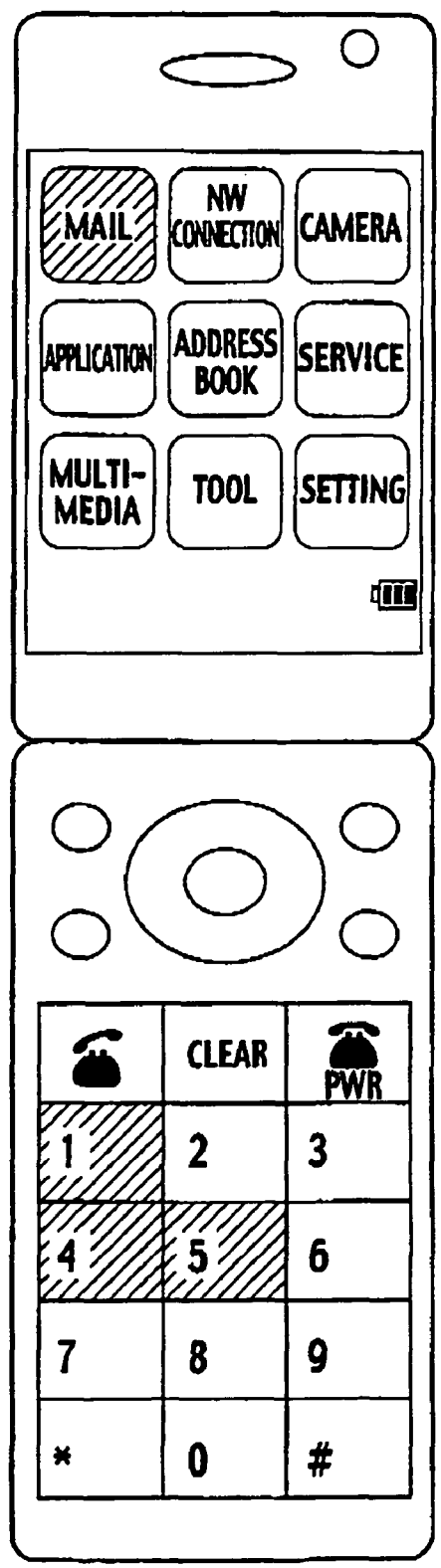
FIG. 21 is a view (part 2) showing a screen displayed on the display unit 20 according to the sixth embodiment of the present invention.

As shown in FIG. 21, in a case where the user touches the keys "1," "4" and "5," the explanation on the function which is assigned to the "1" key arranged in the uppermost row among the keys 30 touched by the user, in other words, the explanation on the function of calling the mail edit screen (the character string "MAIL") is displayed in a state of being focused.

As described above, in a case where there is one key 30 located in the uppermost row (the upper contact key) among the keys 30 touched by the user, the explanation on the function assigned to the upper contact key is displayed in a state of being focused even when there are more than one key 30 located in rows below a row in which the upper contact key locates (lower contact key).

Figure 22:
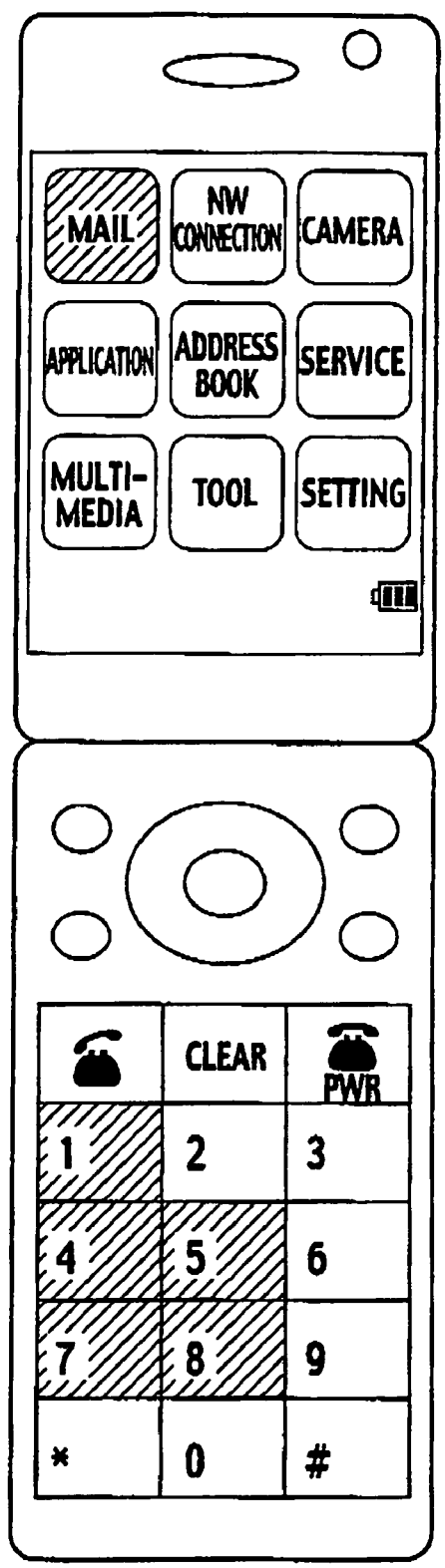
FIG. 22 is a view (part 3) showing a screen displayed on the display unit 20 according to the sixth embodiment of the present invention.

Furthermore, as shown in FIG. 22, in a case where the user touches the keys "1," "4," "5," "7" and "8," the explanation on the function which is assigned to the "1" key arranged in the uppermost row among the keys 30 touched by the user, in other words, the explanation on the function of calling the mail edit screen (the character string "MAIL") is displayed in a state of being focused.

As described above, in a case where there is one key 30 located in the uppermost row (the upper contact key) among the keys 30 touched by the user, the explanation on the function assigned to the upper contact key is displayed in a state of being focused even when there are more than one key 30 located in rows below a row in which the upper contact key locates (lower contact key).

Figure 23:
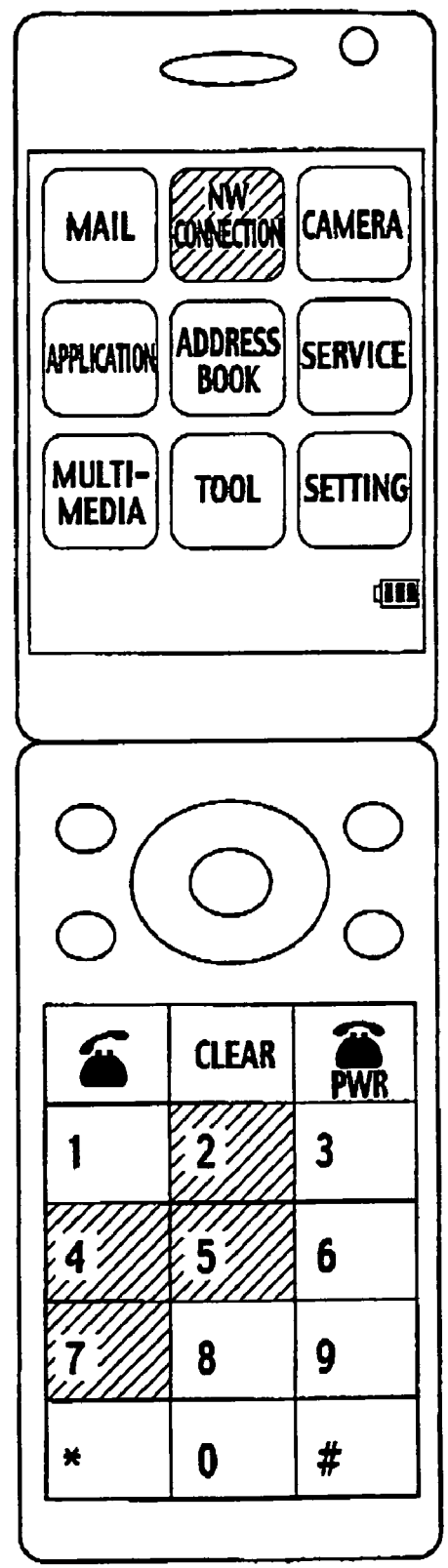
FIG. 23 is a view (part 4) showing a screen displayed on the display unit 20 according to the sixth embodiment of the present invention.

Similarly, as shown in FIG. 23, in a case where the user touches the keys "2," "4," "5" and "7," the explanation on a function which is assigned to the key "2" arranged in the uppermost row among the keys 30 touched by the user, in other words, the explanation on a function of connecting to a network (the character string "NW CONNECTION") is displayed in a state of being focused.

(Actions and Effects)

According to the mobile terminal device 100 of the sixth embodiment of the present invention, in a case where there is one upper contact key located in the uppermost row among the keys 30 touched by the user, the mobile terminal device 100 specifics the upper contact key as the effective contact key.

As described above, in a case where the user touches the keys 30, the user's fingertips generally touch the keys 30. For this reason, criteria for specifying the effective contact key (key specification criteria) are set in view of the fact that the user is unlikely to touch the key 30 arranged in the row above the key 30 which the user intentionally touches.

Accordingly, the mobile terminal device 100 makes it possible to enhance accuracy of specifying the key 30 which the user has intentionally touched even in a case where the user accidentally touches more than one key 30.

[Seventh Embodiment]

A mobile terminal device according to a seventh embodiment of the present invention will be described below with reference to the accompanying drawings. Hereinafter, difference from the above mentioned sixth embodiment will be mainly described.

Specifically, in the sixth embodiment described above, the mobile terminal device specifies the effective contact key in a case where there is one upper contact key. Meanwhile, in the seventh embodiment, the mobile terminal device specifies the effective contact key in a case where there is more than one upper contact key.

(Configuration of Control Board)

Figure 24:
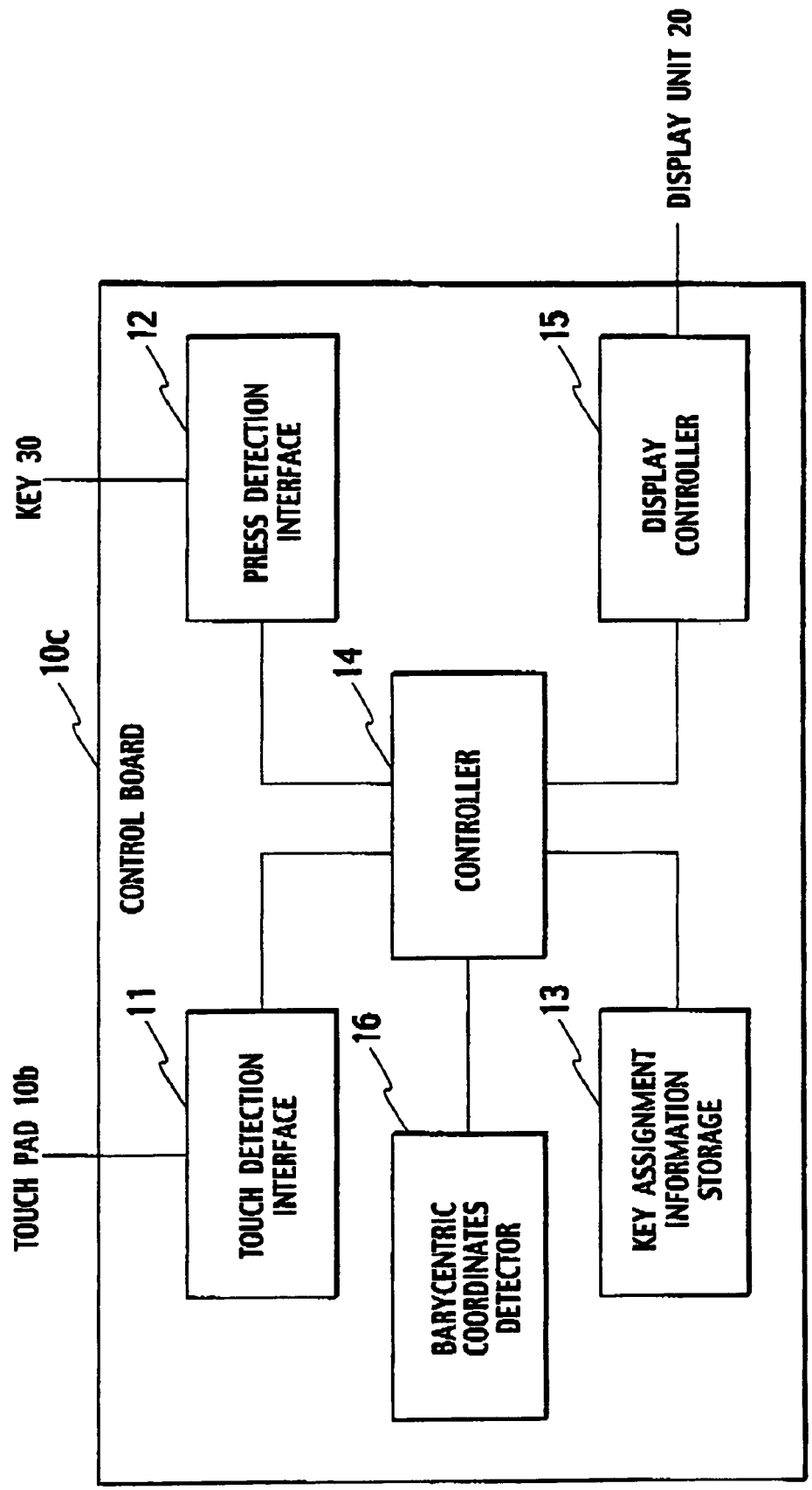
FIG. 24 is a block diagram showing a control board 10c according to a seventh embodiment of the present invention.

With reference to the drawings, description will be provided below for a configuration of a control board 10c according to the seventh embodiment of the present invention. FIG. 24 is a block diagram showing the configuration of the control board 10c according to the seventh embodiment of the present invention. In FIG. 24, the identical constituent components as those in the block diagram shown in FIG. 17 are designated by the identical reference numerals.

As shown in FIG. 24, the control board 10c includes a barycentric coordinates detector 16 in addition to a touch detection interface 11, a press detection interface 12, a key assignment information storage 13, a controller 14 and a display controller 15.

The barycentric coordinates detector 16 specifies an upper representative position which is one position set according to a plurality of upper contact keys in a case where there is more than one key 30 located in the uppermost row (the upper contact key) among the keys 30 touched by the user. Specifically, the barycentric coordinates detector 16 detects coordinates (kc1) to be a barycenter of the plurality of upper contact keys, and specifies the detected coordinates as the upper representative position.

The barycentric coordinates detector 16 specifies a lower representative position which is one position set according to a key 30 located in a row below a row in which the upper contact key locates among the keys 30 touched by the user. Specifically, the barycentric coordinates detector 16 detects coordinates (kc2) to be a barycenter of the lower contact key, and specifies the detected coordinates as the lower representative position.

In a case where there is more than one key 30 located in the uppermost row (the upper contact key) among the keys 30 touched by the user, the controller 14 specifies the effective contact key from the plurality of upper contact keys according to a positional relationship in the right-left direction between the upper representative position and the lower representative position. Specifically, in a case where the upper representative position (kc1) is located to the right of the lower representative position (kc2), the controller 14 specifies the rightmost upper contact key as the effective contact key. Moreover, in a case where the upper representative position (kc1) is located to the left of the lower representative position (kc2), the controller 14 specifies the leftmost upper contact key as the effective contact key.

(Operations of Mobile Terminal Device)

Figure 25:
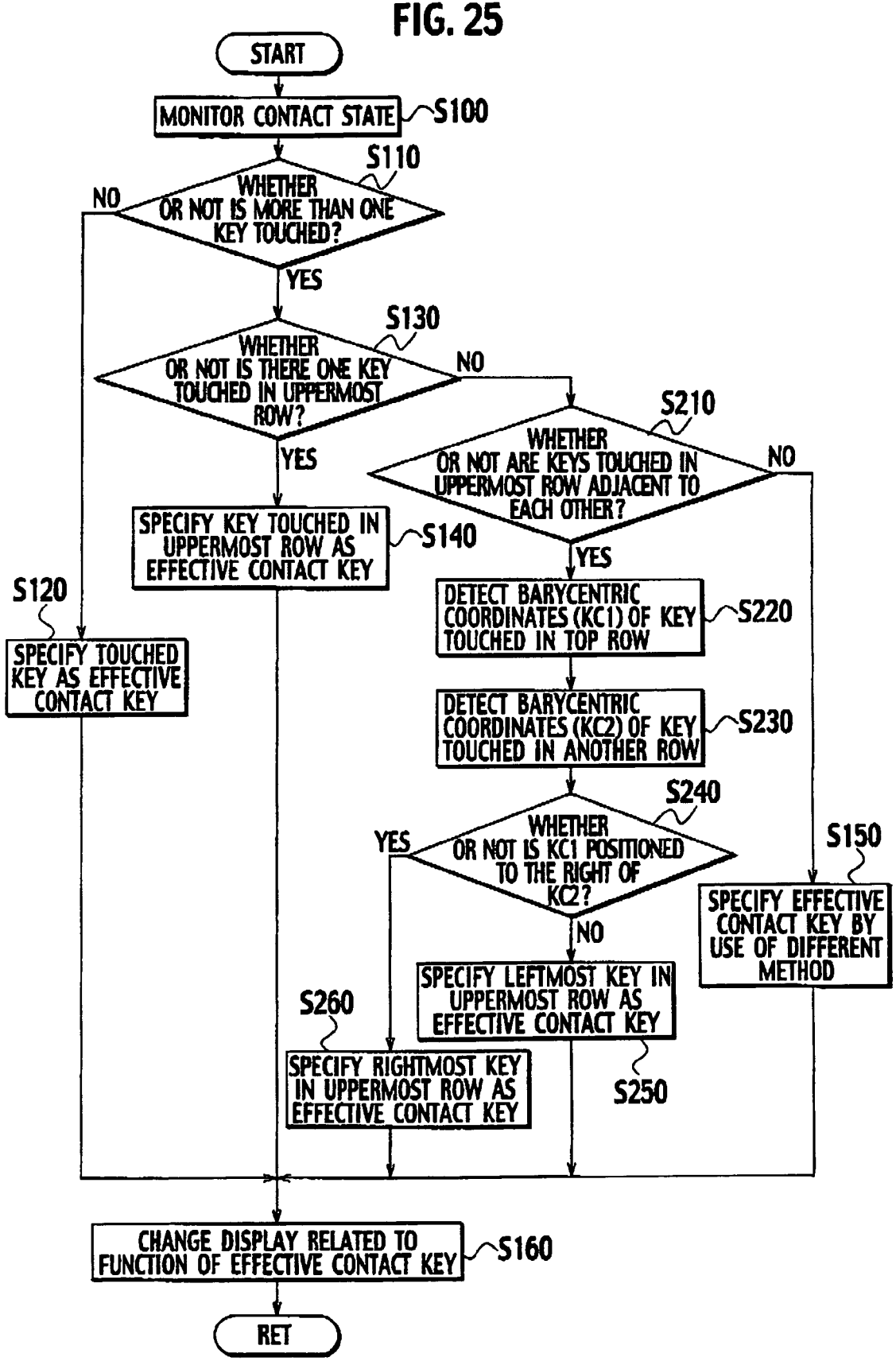
FIG. 25 is a flowchart showing operations of a mobile terminal device 100 according to the seventh embodiment of the present invention.
Figure 26:
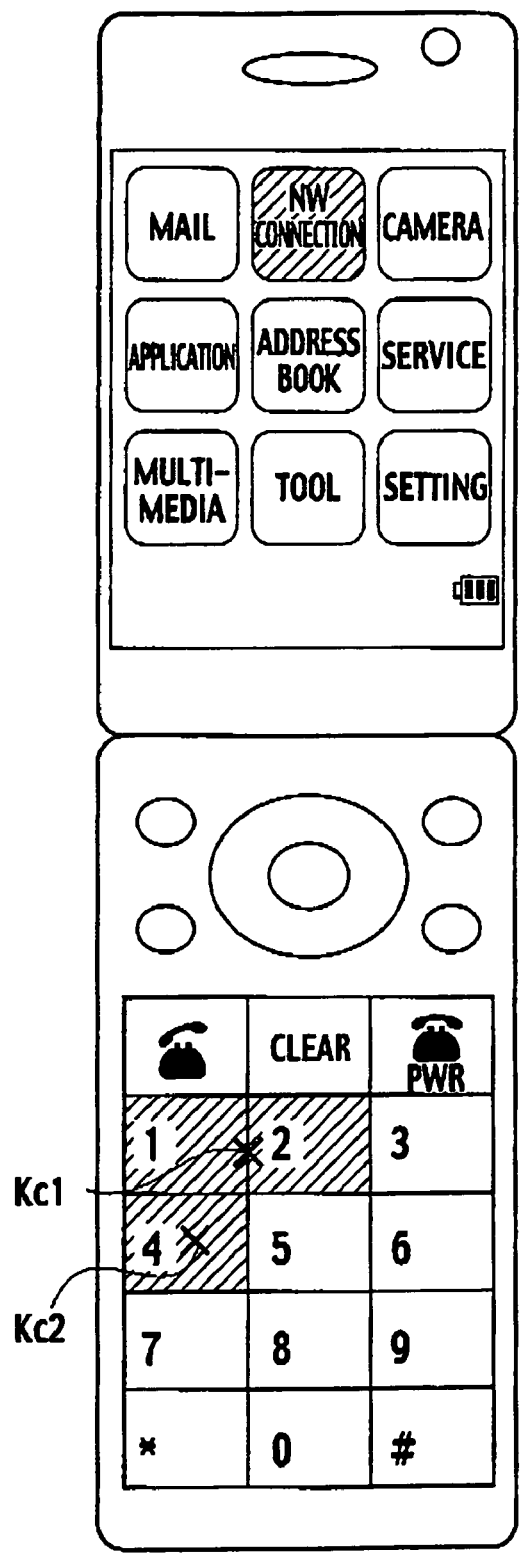
FIG. 26 is a view (part 1) showing a screen displayed on a display unit 20 according to the seventh embodiment of the present invention.

With reference to the drawings, description will be provided below for operations of the mobile terminal device 100 according to the seventh embodiment of the present invention. FIG. 26 is a flowchart showing the operations of the mobile terminal device 100 according to the seventh embodiment of the present invention. In FIG. 25, the identical processes as those in the flowchart shown in FIG. 19 are designated by the identical step numbers.

As shown in FIG. 25, in Step S210, the mobile terminal device 100 determines whether or not the keys 30, which are located in the uppermost row (upper contact keys) among the keys 30 touched by the user, are the keys 30 adjacent to one another The mobile terminal device 100 proceeds to processing of Step S220 in a case where the upper contact keys are the keys 30 adjacent to one another, and proceeds to the processing of Step S150 in a case where the upper contact keys are the keys 30 not adjacent to each other.

Incidentally, the processing of Step S210 is performed in a case where it is determined in the processing of Step S130 that there is more than one key 30 located in the uppermost row (the upper contact key) among the keys 30 touched by the user.

In Step S220, the mobile terminal device 100 detects coordinates (kc1) to be a barycenter of the plurality of upper contact keys, and specifies the detected coordinates (kc1) as an upper representative position.

In Step S230, the mobile terminal device 100 detects coordinates (kc2) to be a barycenter of the key 30 located in a row below a row in which the upper contact key locates (lower contact key) among the keys 30 touched by the user, and thus specifies the detected coordinates (kc2) as a lower representative position.

In Step S240, the mobile terminal device 100 determines whether or not the coordinates (kc1) detected in Step S220 are positioned to the right of the coordinates (kc2) detected in Step S230. The mobile terminal device 100 proceeds to processing of Step S260 in a case where the coordinates (kc1) are positioned to the right of the coordinates (kc2), and proceeds to processing of Step S250 in a case where the coordinates (kc1) are not positioned to the right of the coordinates (kc2).

In Step S250, from the keys 30 located in the uppermost row (the upper contact keys) among the keys 30 touched by the user, the mobile terminal device 100 specifies the leftmost upper contact key as the effective contact key.

In Step S260, from the keys 30 located in the uppermost row (the upper contact keys) among the keys 30 touched by the user, the mobile terminal device 100 specifies the rightmost upper contact key as the effective contact key.

(Display Screen)

Figure 27:
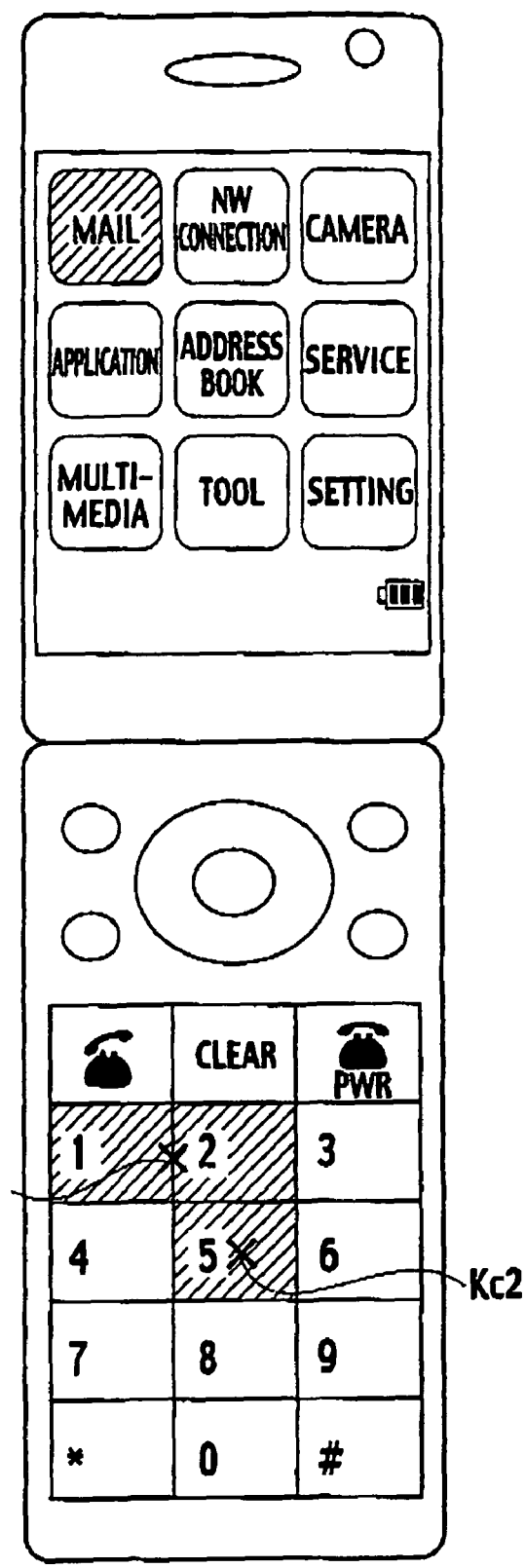
FIG. 27 is a view (part 2) showing a screen displayed on the display unit 20 according to the seventh embodiment of the present invention.

With reference to the drawings, screens displayed in the foregoing display unit 20 will be described below. FIGS. 26 and 27 are views showing examples of screens displayed in the display unit 20 according to the seventh embodiment of the present invention. In the seventh embodiment, as in the case of the sixth embodiment, all of the explanations on the functions assigned to the respective keys 30 (the keys "1" to "9") are previously displayed, and the explanation on the function, which is assigned to the key 30 touched by the user, is displayed in a state of being focused.

As shown in FIG. 26, in a case where the user touches the keys "1," "2" and "4," the explanation on the function assigned to the "2" key in the rightmost position out of the upper contact keys (the keys "1" and "2") among the keys 30 touched by the user, in other words, the explanation on the function of connecting to a network (the character string "NW CONNECTION") is displayed in a state of being focused.

As described above, in a case where there is more than one key 30 located in the uppermost row (the upper contact key) among the keys 30 touched by the user, and where the upper representative position (kc1) is located to the right of the lower representative position (kc2), the explanation on the function assigned to the rightmost upper contact key is displayed in a state of being focused.

Meanwhile, as shown in FIG. 27, in a case where the user touches the keys "1," "2" and "5," the explanation on the function assigned to the "1" key in the leftmost position out of the upper contact keys (the keys "1" and "2") among the keys 30 touched by the user, in other words, the explanation on the function of calling the mail edit screen (the character string "MAIL") is displayed in a state of being focused.

As described above, in a case where there is more than one key 30 located in the uppermost row (the upper contact key)

among the keys 30 touched by the user, and where the upper representative position (kc1) is located to the left of the lower representative position (kc2), the explanation on the function assigned to the leftmost upper contact key is displayed in a state of being focused.

(Actions and Effects)

According to the mobile terminal device 100 of the seventh embodiment of the present invention, in a case where there is more than one upper contact key which is located in the uppermost row among the keys 30 touched by the user, the mobile terminal device 100 specifies the effective contact key from the plurality of upper contact keys on the basis of the positional relationship in the right-left direction between the upper representative position and the lower representative position.

As described above, in a case where the user's right hand touches the keys 30, the user's fingers generally touch the keys 30. For this reason, criteria for specifying the effective contact key (key specification criteria) are set in view of the fact that the user is unlikely to touch the key 30 arranged in a row to the left of the key 30 which the user intentionally touches.

Similarly, in a case where the user's left hand touches the keys 30, the user's fingertips generally touch the keys 30. For this reason, criteria for specifying the effective contact key (key specification criteria) are set in view of the fact that the user is unlikely to touch the key 30 arranged in a row to the right of the key 30 which the user intentionally touches.

Accordingly, the mobile terminal device 100 makes it possible to enhance accuracy of identifying the key 30 which the user has intentionally touched even in a case where the user accidentally touches more than one key 30 when there are a plurality of upper contact keys.

[Eighth Embodiment]

A mobile terminal device according to a eighth embodiment of the present invention will be described below with reference to the accompanying drawings. Hereinafter, difference from the above mentioned seventh embodiment will be mainly described.

Specifically, in the seventh embodiment described above, in a case where the upper representative position (kc1) is located to the right of the lower representative position (kc2), the explanation on the function assigned to the rightmost upper contact key is displayed in a state of being focused. In a case where the upper representative position (kc1) is located to the left of the lower representative position (kc2), the explanation on the function assigned to the leftmost upper contact key is displayed in a state of being focused.

Meanwhile, in the eighth embodiment, the mobile terminal device specifies an effective contact key in a case where the upper representative position (kc1) and the lower representative position (kc2) are identical in the right-left direction.

(Configuration of Control Board)

Figure 28:
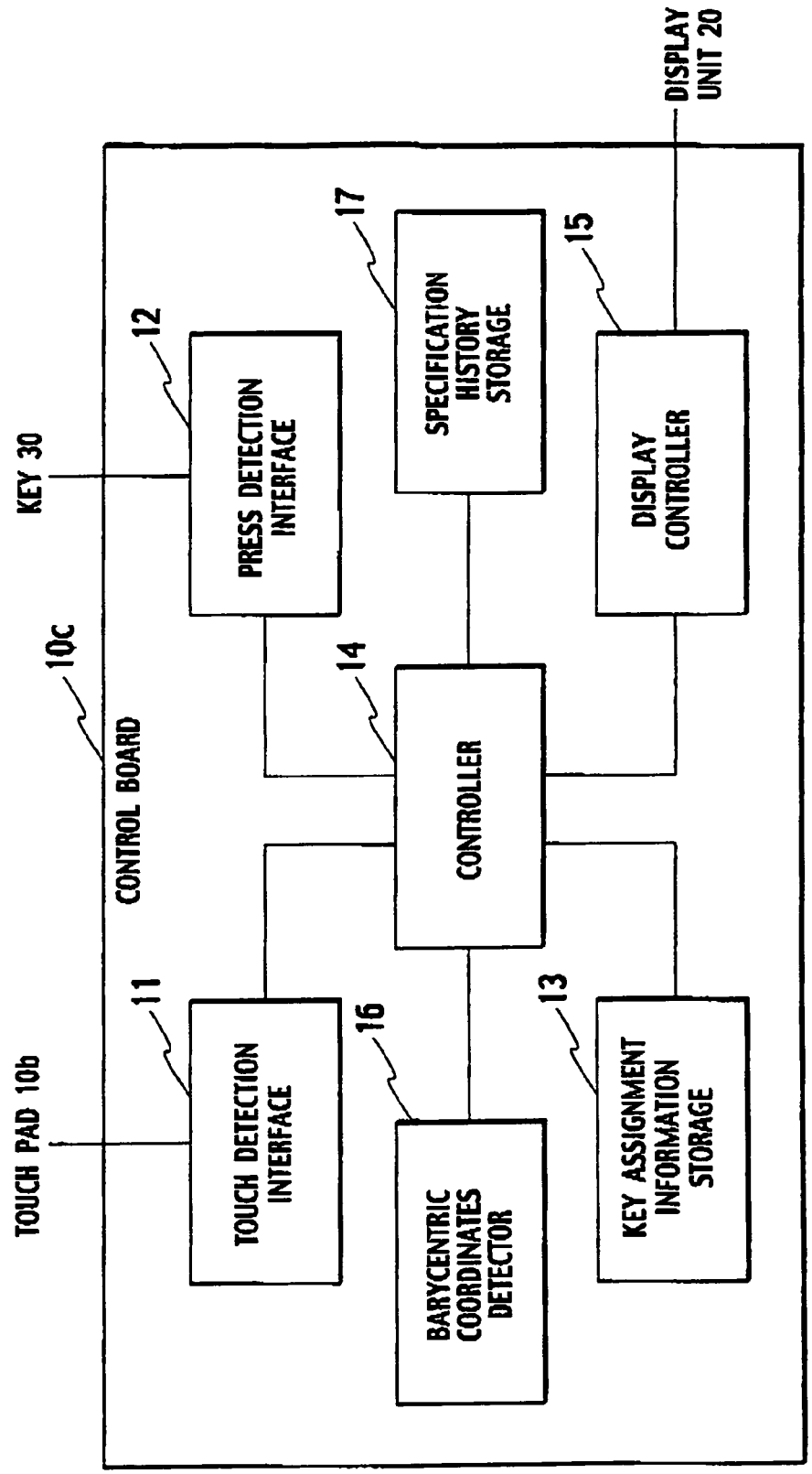
FIG. 28 is a block diagram showing a control board 10c according to a eighth embodiment of the present invention.

With reference to the drawings, descriptions will be provided below for a configuration of a control board 10c according to the eighth embodiment of the present invention. FIG. 28 is a block diagram showing the configuration of the control board 10c according to the eighth embodiment of the present invention. In FIG. 28, the identical constituent components as those in the block diagram shown in FIG. 24 are designated by the identical reference numerals.

As shown in FIG. 28, the control board 10c includes a specification history storage 17 in addition to a touch detection interface 11, a press detection interface 12, a key assignment information storage 13, a controller 14, a display controller 15 and a barycentric coordinates detector 16.

The specification history storage 17 stores a specification history result which is a history of specifying the effective contact key based on a positional relationship between the upper representative position (kc1) and the lower representative position (kc2) Specifically, the specification history storage 17 is a counter (Cnt) for counting a difference between a frequency of specifying the rightmost upper contact key as the effective contact key and a frequency of specifying the leftmost upper contact key as the effective contact key.

In the counter (Cnt) according to the eighth embodiment, "1" is added to the value of the counter (Cnt) when the rightmost upper contact key is specified as the effective contact key, and "1" is subtracted from the value of the counter (Cnt) when the leftmost upper contact key is specified as the effective contact key.

In a case where the upper representative position (kc1) and the lower representative position (kc2) are identical in the right-left direction, the controller 14 specifies the effective contact key by referring to the history (the specification history result) of specifying the effective contact key based on the positional relationship between the upper representative position (kc1) and the lower representative position (kc2). Specifically, in a case where the value of the counter (Cnt) is positive, the controller 14 specifies the rightmost upper contact key as the effective contact key. On the other hand, in a case where the value of the counter (Cnt) is 0 or less, the controller 14 specifies the leftmost upper contact key as the effective contact key.

(Operations of Mobile Terminal Device)

Figure 29:
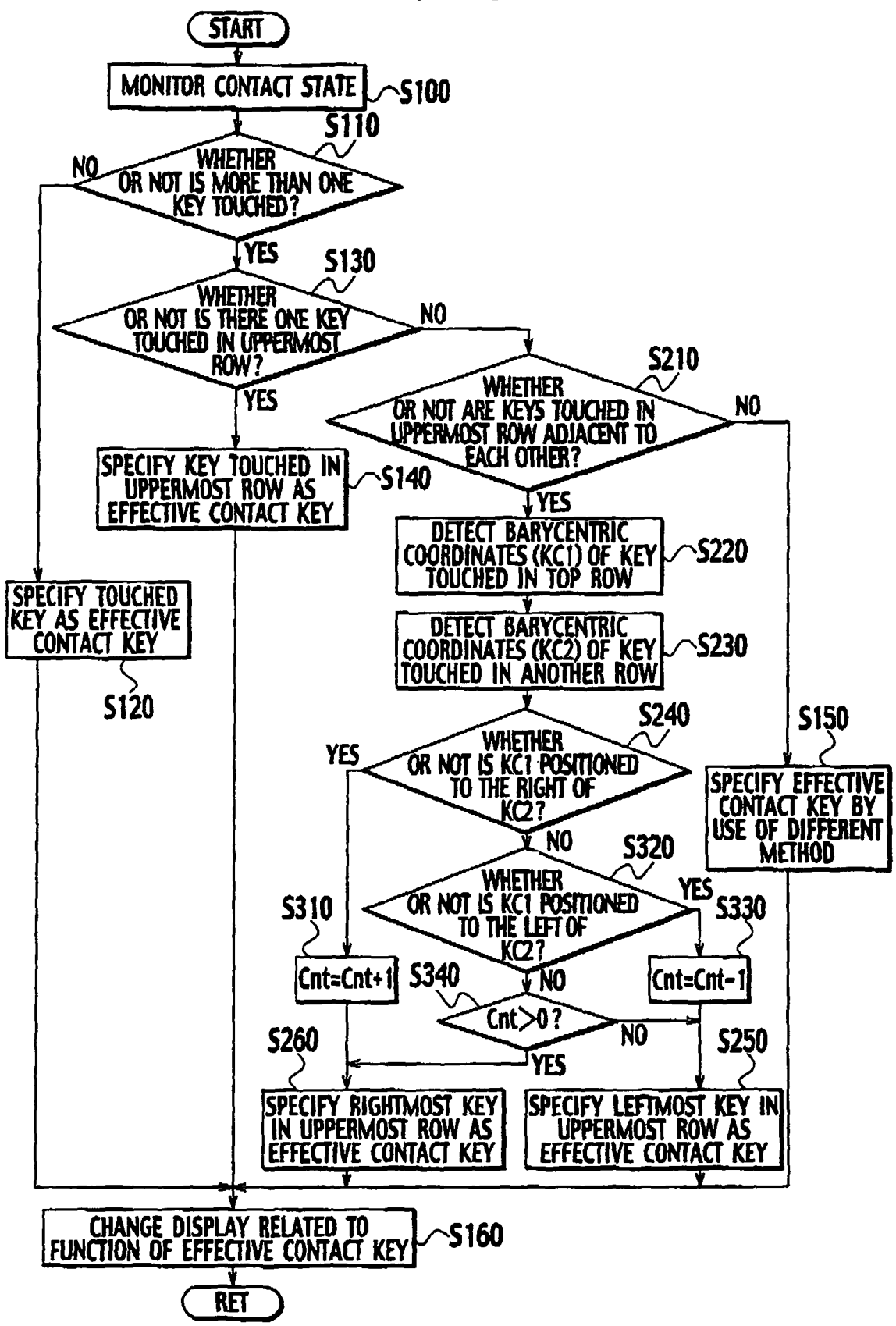
FIG. 29 is a flowchart showing operations of a mobile terminal device 100 according to the eighth embodiment of the present invention.

With reference to the drawings, descriptions will be provided below for operations of the mobile terminal device 100 according to the eighth embodiment of the present invention. FIG. 29 is a flowchart showing the operations of the mobile terminal device 100 according to the eighth embodiment of the present invention. In FIG. 29, the identical processes as those in the flowchart shown in FIG. 25 are designated by the identical step numbers.

As shown in FIG. 29, in Step S310, the mobile terminal device 100 adds "1" to the value of the counter (Cnt). Note that the processing of Step S310 is performed in a case where it is determined in the processing of Step S240 that the upper representative position (kc1) is located to the right of the lower representative position (kc2).

In Step S320, the mobile terminal device 100 determines whether or not the upper representative position (kc1) is located to the left of the lower representative position (kc2). The mobile terminal device 100 proceeds to processing of Step S330 in a case where the upper representative position (kc1) is located to the left of the lower representative position (kc2), and proceeds to processing of Step S340 in a case where the upper representative position (kc1) and the lower representative position (kc2) are identical in the right-left direction.

Note that the processing of Step S320 is performed in a case where it is not determined in Step S240 that the upper representative position (kc1) is located to the right of the lower representative position (kc2).

In Step S330, the mobile terminal device 100 subtracts "1" from the value of the counter (Cnt).

In Step S340, the mobile terminal device 100 reads the value of the counter (Cnt), and determines whether or not the value of the counter (Cnt) is positive. The mobile terminal device 100 proceeds to the processing of Step 260 in a case where the value of the counter (Cnt) is positive, and proceeds to the processing of Step 250 in a case where the value of the counter (Cnt) is not positive.

As described above, in a case where the upper representative position (kc1) and the lower representative position (kc2) are identical in the right-left direction, the mobile terminal device 100 specifies the effective contact key based on the value of the counter (Cnt).

In the eighth embodiment, in a case where the upper representative position (kc1) and the lower representative position (kc2) are identical in the right-left direction, the effective contact key is specified on the basis of the value of the counter (Cnt). However, the present invention is not limited to the above.

To be more specific, the effective contact key may be specified on the basis of the value of the counter (Cnt) in a case where there is more than one upper contact key, and where there are no lower contact keys located in rows below a row in which the upper contact keys are positioned.

(Display Screen)

Figure 30:
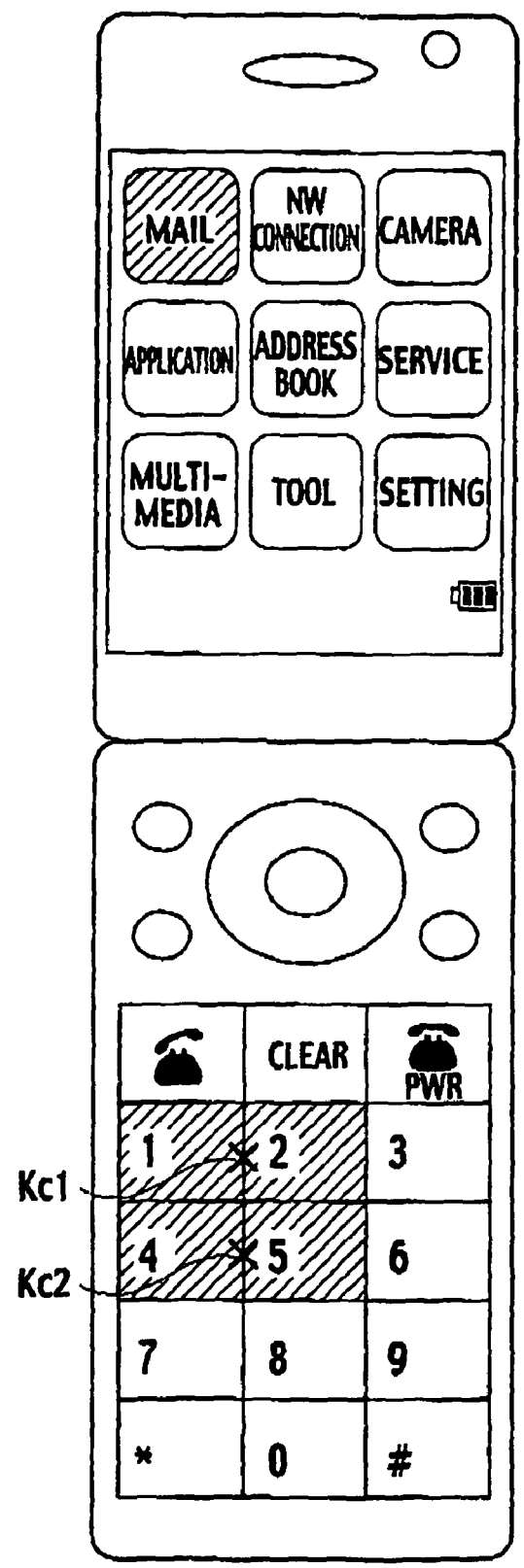
FIG. 30 is a view showing a screen displayed on a display unit 20 according to the eighth embodiment of the present invention.

With reference to the drawings, descriptions will be provided below for a screen displayed in a display unit 20 according to the eighth embodiment of the present invention. FIG. 30 is a view showing the screen displayed in the display unit 20 according to the eighth embodiment of the present invention. In the eighth embodiment, as in the case of the seventh embodiment, all of the explanations on functions assigned to the respective keys 30 (the keys "1" to "9") are previously displayed, and the explanation on the function, which is assigned to the key 30 touched by the user, is displayed in a state of being focused. In FIG. 30, descriptions will be provided by taking a case, as an example, where the value of the counter (Cnt) described above is "0" or less.

As shown in FIG. 30, in a case where the user touches the keys "1," "2," "4" and "5," the explanation on the function assigned to the "1" key in the leftmost position out of the upper contact keys (the keys "1" and "2") among the keys 30 touched by the user, in other words, the explanation on the function of calling a mail edit screen (the character string "MAIL") is displayed in a state of being focused.

As described above, in a case where there is more than one key 30 located in the uppermost row (the upper contact key) among the keys 30 touched by the user, and where the upper representative position (kc1) and the lower representative position (kc2) are identical in the right-left direction, the explanation on a function assigned to the upper contact key specified according to the value of the counter (Cnt) is displayed in a state of being focused.

(Actions and Effects)

According to the mobile terminal device 100 of the eighth embodiment of the present invention, in a case where the upper representative position and the lower representative position are identical in the right-left direction, the mobile terminal device 100 specifies the effective contact key by referring to the history (the specification history result and the counter (Cnt)) of specifying the effective contact key based on the positional relationship between the upper representative position (kc1) and the lower representative position (kc2).

As described above, criteria for specifying the effective contact key (key specification criteria) are set in view of the fact that, in a case where the user accidentally touches more than one key 30, tendency of the keys 30, which the user is more likely to operate by mistake, is reflected in the specification history result (the counter (Cnt)).

Hence, the mobile terminal device 100 makes it possible to enhance accuracy of identifying the key 30 which the user has intentionally touched even in a case where the user accidentally touches more than one key 30, and where the upper representative position and the lower representative position are identical in the right-left direction.

Moreover, the mobile terminal device 100 makes it possible to enhance the accuracy of identifying the key 30 which the user has intentionally touched even in a case where the user accidentally touches more than one key 30 when there is more than one upper contact key, and where there are no lower contact keys located in rows below a row in which the upper contact keys are positioned.

[Ninth Embodiment]

A mobile terminal device according to a ninth embodiment of the present invention will be described below with reference to the accompanying drawings. Hereinafter, difference from the above mentioned eighth embodiment will be mainly described.

Specifically, in the ninth embodiment, in a case where the keys 30 touched by the user are not adjacent to each other, an effective contact key is specified from the keys 30 touched by the user.

(Configuration of Control Board)

Figure 31:
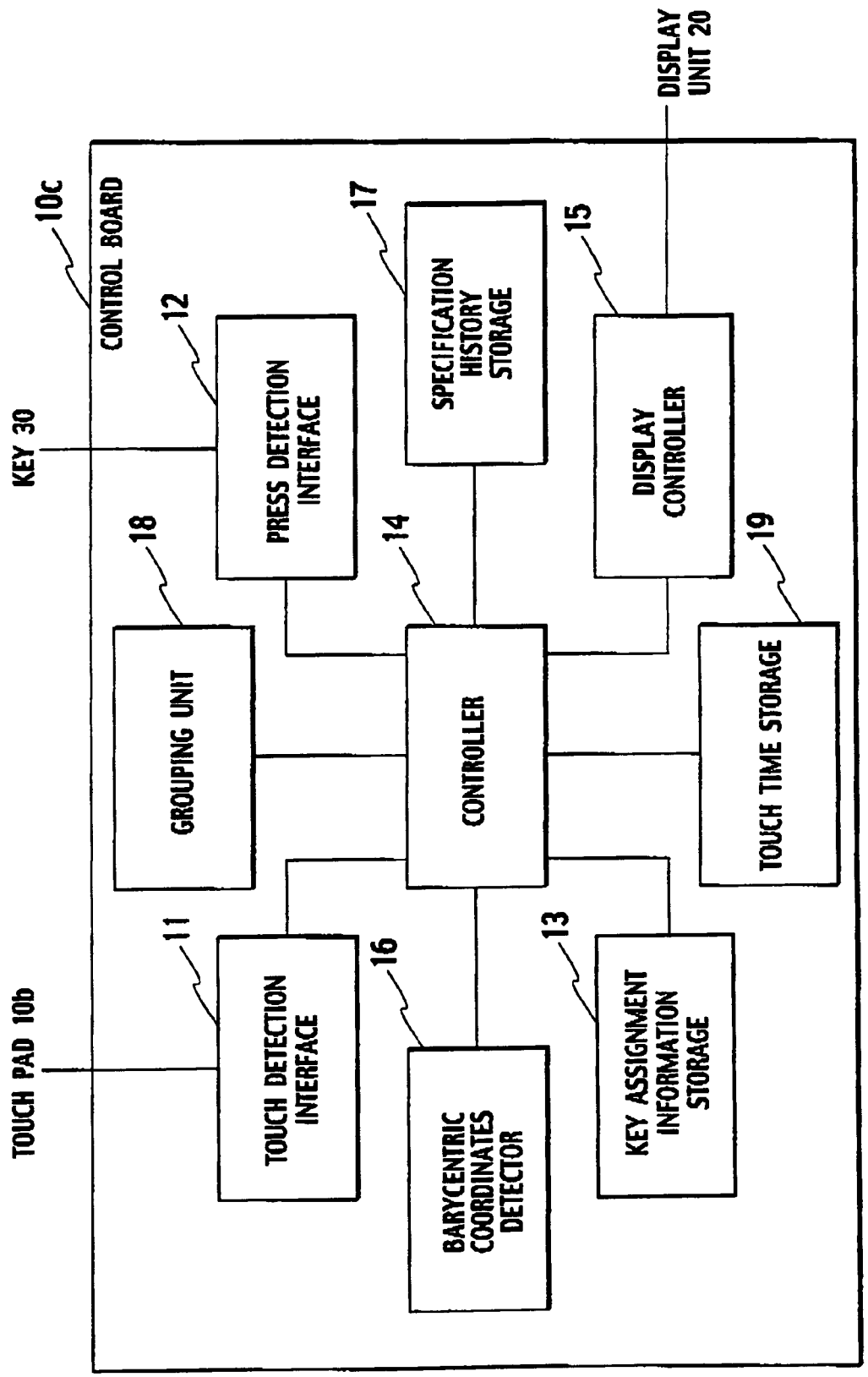
FIG. 31 is a block diagram showing a control board 10c according to a ninth embodiment of the present invention.

With reference to the drawings, descriptions will be provided below for a configuration of a control board 10c according to the ninth embodiment of the present invention. FIG. 31 is a block diagram showing the configuration of the control board 10c according to the ninth embodiment of the present invention. In FIG. 31, the identical constituent components as those in the block diagram shown in FIG. 28 are designated by the identical reference numerals.

As shown in FIG. 31, the control board 10c includes a grouping unit 18 and a touch time storage 19 in addition to a touch detection interface 11, a press detection interface 12, a key assignment information storage 13, a controller 14, a display controller 15, a barycentric coordinates detector 16 and a specification history storage 17.

The grouping unit 18 groups a plurality of keys 30 touched by the user into key groups when the user touches the keys 30 by setting, as one key group, the keys 30 which is adjacent to any of the keys 30 touched by the user. Specifically, in a case where the keys 30 touched by the user are adjacent to each other in the vertical direction or in the right-left direction, the grouping unit 18 groups the keys 30 as one key group. Incidentally, in a case where the keys 30 touched by the user are in a positional relationship where the keys are only located in an oblique direction, the grouping unit 18 groups the keys 30 into separate key groups. Note that the key group may include one key 30 or a plurality of keys 30.

The touch time storage 19 stores, as touch time information, the keys 30 touched by the user and time (touch time) when the user touches the keys 30, in association with each other Details of the touch time information will be described later (see FIGS. 32A to 32D).

In a case where there is more than one key group, the controller 14 identifies a key group including a key 30 having the latest touch time, and thus specifies the effective contact key from the key group including the key 30 having the latest touch time. Any one of the methods described in the aforementioned sixth to eighth embodiments is used as a method of specifying the effective contact key (Touch Time Information)

With reference to the drawings, the foregoing touch time information will be described below. FIGS. 32A to 32D are tables showing examples of the touch time information according to the ninth embodiment of the present invention.

As shown in FIG. 32A, in a case where the user touches the keys "1" and "3," the touch time storage 19 stores the "1" key and time (touch time) when the user touches the "1" key in association with each other, and concurrently stores the "3"

key and time (touch time) when the user touches the "3" key in association with each other. Since the keys "1" and "3" are not adjacent to each other, the keys are grouped respectively into different key groups (a first key group and a second key group).

As shown in FIG. 32B, in a case where the user touches the keys "1," "3" and "5," the touch time storage 19 stores information on times (touch times) when the user touches the keys "1," "3" and "5" and on the same keys respectively in association with each other. Since the keys "1," "43" and "55" are not adjacent to one another, the keys are grouped respectively into different key groups (the first key group, the second key group and a third key group).

Furthermore, as shown in FIG. 32C, in a case where the user touches the keys "1," "4," "6" and "7," the touch time storage 19 stores information on times (touch times) when the user touches the keys "1," "4," "6" and "7" and on the same keys respectively in association with each other. Since the keys "1," "4" and "7" are adjacent to at least one of the same keys, the keys are grouped into one key group (the second key group). Meanwhile, since the key "6" is not adjacent to any of the keys "1," "4" and "7," the key is grouped into a key group (the first key group) different from that of the keys "1," "4" and "7" (the second key group).

As shown in FIG. 32D, in a case where the user touches the keys "1," "7," "8" and "9", the touch time storage 19 stores information on times (touch times) when the user touches the keys "1," "7," "8" and "9" and on the same keys respectively in association with each other. Since the keys "7," "8" and "9" are adjacent to at least one of the keys, the keys are grouped into one key group (the second key group). Meanwhile, since the "1" key is not adjacent to any of the keys "7," "8" and "9," the key is grouped into a key group (the first key group) different from that of the keys "7," "8" and "9" (the second key group).

(Operations of Mobile Terminal Device)

Figure 33:
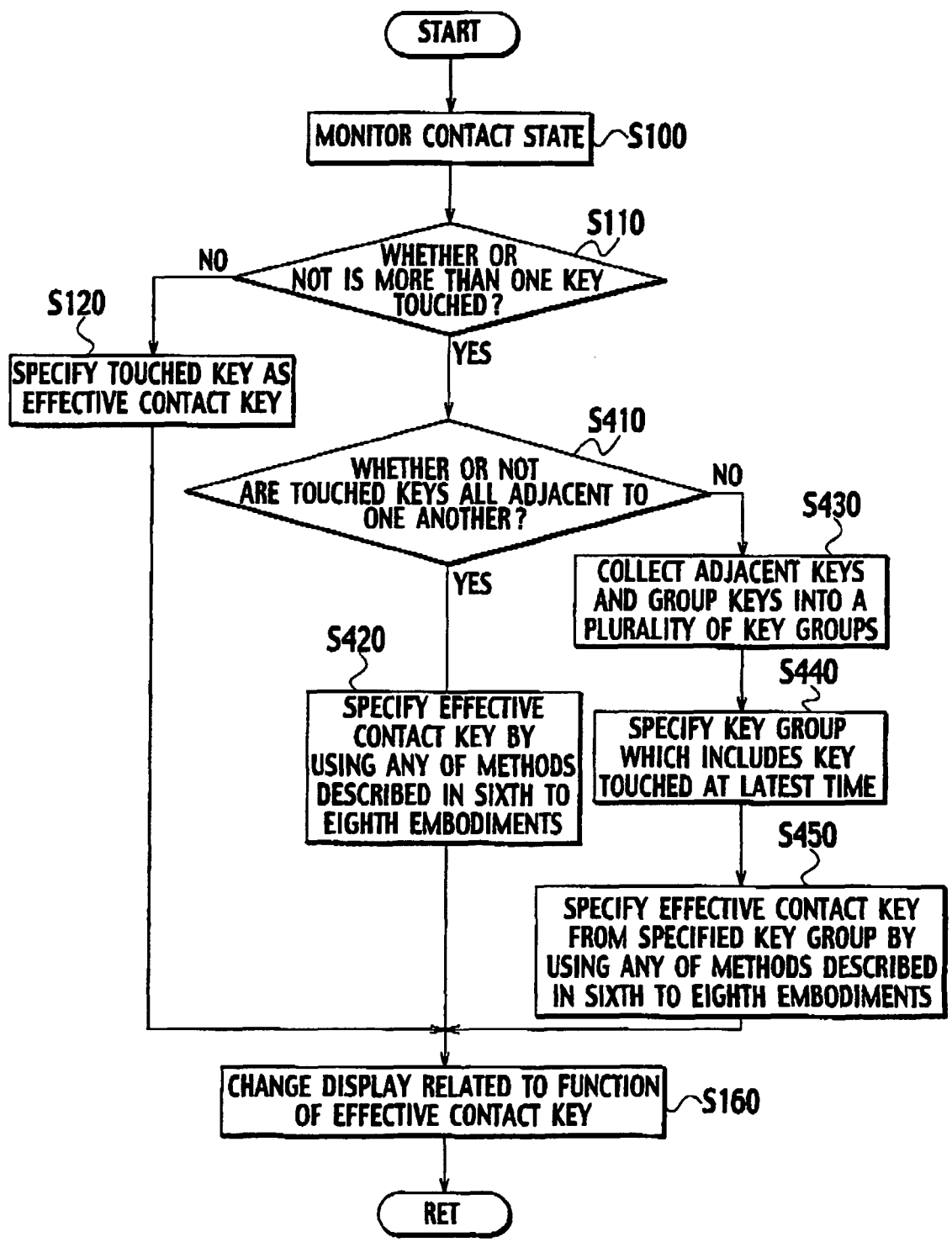
FIG. 33 is a flowchart showing operations of a mobile terminal device 100 according to the ninth embodiment of the present invention.

With reference to the drawings, descriptions will be provided below for operations of the mobile terminal device 100 according to the ninth embodiment of the present invention. FIG. 33 is a flowchart showing the operations of the mobile terminal device 100 according to the ninth embodiment of the present invention. In FIG. 33, the identical processes as those in the flowchart shown in FIG. 29 are designated by the identical step numbers.

As shown in FIG. 33, in Step S410, the mobile terminal device 100 determines whether or not the positions of the keys 30 touched by the user are all adjacent to one another. Specifically, the mobile terminal device 100 determines whether or not the keys 30 touched by the user include a key 30 which is not adjacent to any of the keys 30 touched by the user. The mobile terminal device 100 proceeds to processing of Step S420 in a case where there are no keys 30 which are not adjacent to any of the keys 30 touched by the user, and proceeds to processing of Step S430 in a case where there is a key 30 which is not adjacent to any of the keys 30 touched by the user. Note that the processing of Step S410 is performed in a case where it is determined in Step S110, that there is more than one key 30 touched by the user.

In Step S420, the mobile terminal device 100 specifies an effective contact key by using any of the methods described in the foregoing sixth to eighth embodiments.

In Step S430, the mobile terminal device 100 groups the keys 30 touched by the user into a plurality of key groups by setting the key 30 adjacent to any of the keys 30 touched by the user as one key group.

In Step S440, the mobile terminal device 100 identifies a key group including a key 30 which is touched last (that is, the key 30 having the latest touch time).

In Step S450, the mobile terminal device 100 specifies the effective contact key from the key group identified in Step S440, by using any of the methods described in the foregoing sixth to eighth embodiments.

(Display Screen)

With reference to the drawings, descriptions will be provided below for screens displayed in the display unit 20 described above. FIGS. 34 to 37 are views showing examples of screens displayed in the display unit 20 according to the ninth embodiment of the present invention. In the ninth embodiment, as in the case of the eighth embodiment, all of the explanation on the functions assigned to the respective keys 30 (the keys "1" to "9") are previously displayed, and the explanation on the function, which is assigned to the key 30 touched by the user, is displayed in a state of being focused.

Figure 34:
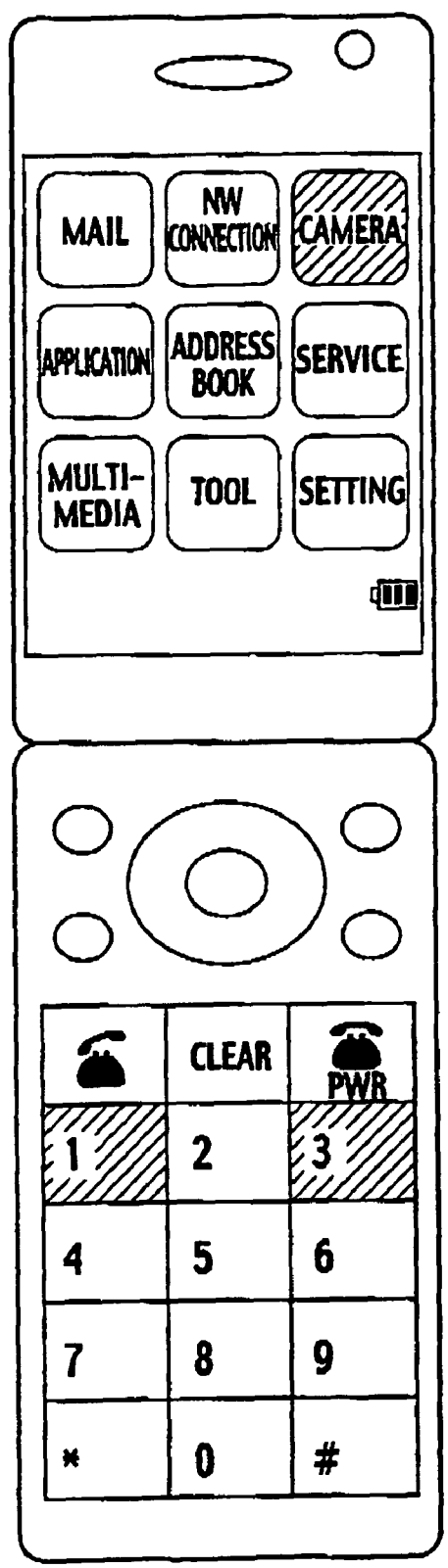
FIG. 34 is a view (part 1) showing a screen displayed on a display unit 20 according to the ninth embodiment of the present invention.

FIG. 34 is a view showing an example of a screen displayed in the display unit 20 in a case where the user touches the keys "1" and "3". In FIG. 34, the touch time of each key 30 corresponds to that shown in FIG. 32A described above.

As shown in FIG. 34, the explanation on the function assigned to the "3" key having the latest touch time, in other words, the explanation on the function of starting a camera (the character string "CAMERA") is displayed in a state of being focused.

As described above, in a case where the keys 30 touched by the user are grouped into a plurality of key groups, the mobile terminal device 100 identifies a key group including a key 30 having the latest touch time. Moreover, the mobile terminal device 100 specifies the effective contact key from the identified key group, and displays the explanation on the function assigned to the specified effective contact key.

Figure 35:
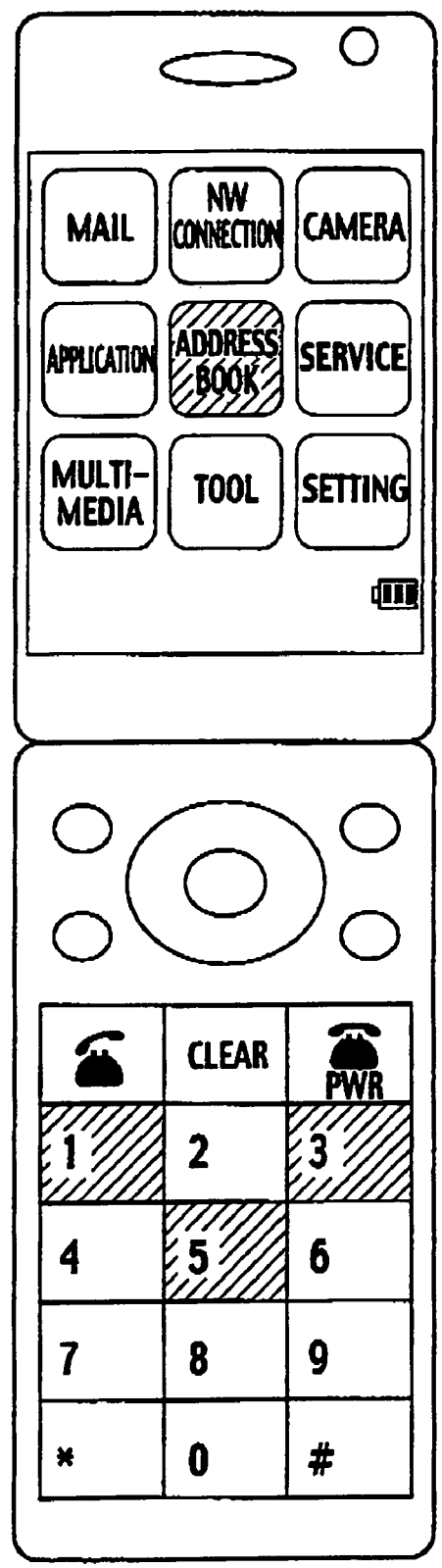
FIG. 35 is a view (part 2) showing a screen displayed on the display unit 20 according to the ninth embodiment of the present invention.

Similarly, FIG. 35 is a view showing an example of a screen displayed in the display unit 20 in a case where the user touches the keys "1," "3" and "5," In FIG. 35, the touch time of each key 30 corresponds to that shown in FIG. 32B described above.

As shown in FIG. 35, the explanation on the function assigned to the "5" key having the latest touch time, in other words, the explanation on the function of calling an address book (the character string "ADDRESS BOOK") is displayed in a state of being focused. Since the keys "1," "3" and "5" are not adjacent to any of the same keys, the keys are grouped into different key groups.

As in the case of FIG. 34, in a case where the keys 30 touched by the user are grouped into the plurality of key groups, the mobile terminal device 100 identifies a key group including a key 30 having the latest touch time. Moreover, the mobile terminal device 100 specifies the effective contact key from the identified key group, and displays the explanation on the function assigned to the specified effective contact key.

Figure 36:
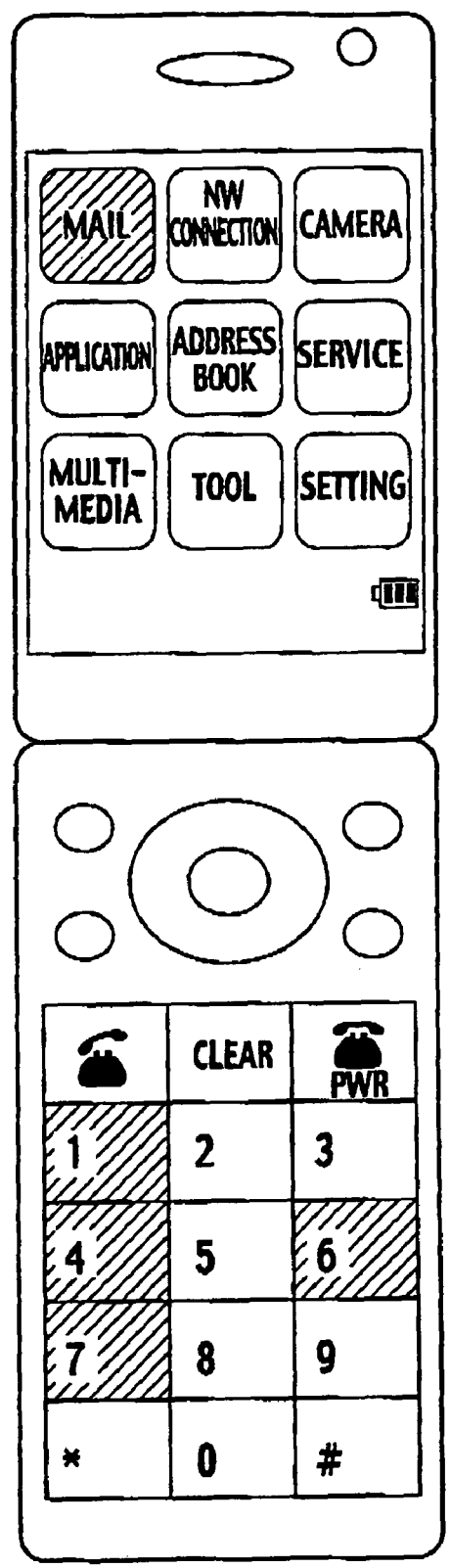
FIG. 36 is a view (part 3) showing a screen displayed on the display unit 20 according to the ninth embodiment of the present invention.

FIG. 36 is a view showing an example of a screen displayed in the display unit 20 in a case where the user touches the keys "1," "4," "6" and "7," In FIG. 36, the touch time of each of the keys 30 corresponds to that shown in FIG. 32C described above.

As shown in FIG. 36, the explanation on the function assigned to the "1" key which is arranged in the uppermost row in the key group including the "1" key (the key "4" or "7"), and which has the latest touch time, in other words, the explanation on the function of calling a mail edit screen (the character string "MAIL") is displayed in a state of being focused. Since the keys "1," "4" and "7" are adjacent to at least one of the same keys, the keys are grouped into one key group. Meanwhile, since the key "6" is not adjacent to any of the keys "1," "4" and "7," the key is grouped into a key group different from that of the keys "1,", "4" and "7."

As described above, in a case where the keys 30 touched by the user are grouped into the plurality of key groups, the mobile terminal device 100 identifies a key group which includes a key 30 having the latest touch time. In a case where there is one key 30 located in the uppermost row (upper contact key) among the keys 30 included in the identified key group, the mobile terminal device 100 specifies the upper contact key as the effective contact key, and displays the explanation on the function assigned to the specified effective contact key (see the sixth embodiment).

Figure 37:
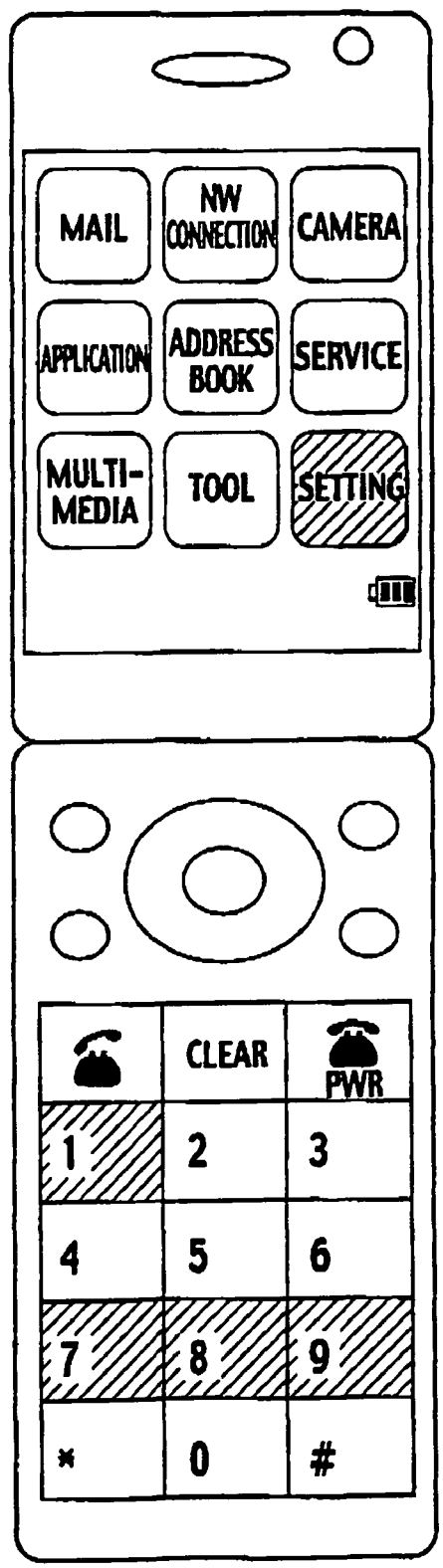
FIG. 37 is a view (part 4) showing a screen displayed on the display unit 20 according to the ninth embodiment of the present invention.

FIG. 37 is a view showing an example of a screen displayed in the display unit 20 in a case where the user touches the keys "1," "7," "8" and "9." In FIG. 37, the touch time of each key 30 corresponds to that shown in FIG. 32D described above. Moreover, the counter (Cnt) described above has a value larger than "0."

As shown in FIG. 37, the explanation on the function assigned to the "9" key which is in the rightmost position in the key group including the "7" key (the "8" key or "9" key), and which has the latest touch time, in other words, the explanation on the function of calling a screen for changing a setting (the character string "SETTING") is displayed in a state of being focused. Since the keys "7," "8" and "9" are adjacent to at least one of the same keys, the keys are grouped into one key group. Meanwhile, since the "1" key is not adjacent to any of the keys "7," "8" and "9," the key is grouped into a key group different from that of the keys "7," "8" and "9."

As described above, in a case where the keys 30 touched by the user are grouped into the plurality of key groups, the mobile terminal device 100 identifies a key group which includes a key 30 having the latest touch time. In a case where there is more than one key 30 located in the uppermost row (the upper contact key) among the keys 30 included in the identified key group, and where there are no lower contact keys located in rows below a row in which the upper contact keys locate, the mobile terminal device 100 specifies the effective contact key based on the value of the counter (Cnt), and displays the explanation on the function assigned to the specified effective contact key (see the eighth embodiment).

(Actions and Effects)

According to the mobile terminal device 100 of the ninth embodiment of the present invention, when the user touches the plurality of keys 30, the mobile terminal device 100 groups the keys 30 touched by the user into key groups by setting the key 30, which is adjacent to any of the keys 30 touched by the user, as one key group.

Moreover, in a case where there is more than one key group, the mobile terminal device 100 identifies a key group including a key 30 having the latest touch time, and thus specifies the effective contact key from that key group.

As described above, assuming the case where both of the user's hands operate the mobile terminal device 100, the user generally supports the mobile terminal device 100 with one hand, and operates the mobile terminal device 100 with the other hand. Specifically, criteria for specifying the effective contact key (key specification criteria) are set in view of the fact that the user may accidentally touch the keys 30 with one hand which supports the mobile terminal device 100.

Accordingly, the mobile terminal device 100 makes it possible to enhance accuracy of identifying the key 30 which the user has intentionally touched even in a case where the user accidentally touches the keys 30 with one hand which supports the mobile terminal device 100.

[Modified Examples]

In the sixth to ninth embodiments described above, the explanations on the functions are displayed in the display unit 20 to notify the user of the explanations. However, the present invention is not limited to the above. The user may be notified of the explanations aurally or tactually. For example, the user may be notified of the explanations on the functions by means of audio, Braille and the like.

Moreover, it is also possible to provide a program for causing a computer to execute the operations of the mobile terminal device 100 according to any of the sixth to ninth embodiments.

Furthermore, in the sixth to ninth embodiments, the touch pad 10b is configured to only detect the user touching the keys 30. However, the present invention is not limited thereto. The touch pad 10b may be also configured to detect the user touching the keys 30 and the user pressing the keys 30.

The mobile terminal device 100 may specify, as the effective contact key, the key 30 which has a largest area touched by the user among the keys 30 touched by the user.

Out of the keys 30 touched by the user, the mobile terminal device 100 may specify, as the effective contact key, the key 30 which has the largest pressure applied thereto when touched by the user.

What is claimed is:

1. A mobile terminal device provided with a plurality of keys, comprising:
    a touch detector configured to continuously detect a user touching a key;
    a press detector configured to detect the user pressing the key;
    a display unit configured to sequentially display a plurality of characters one by one in a predetermined sequence, as candidate characters, assigned to the key pressed by the user, whenever the press detector detects the user pressing the key; and
    a controller configured to start an untouched time period when the touch detector does not detect touching of the key, and configured to convert the candidate character displayed on the display unit and assigned to a last-touched key to a finalized character, when the untouched time period expires, the candidate character remaining un-finalized and the untouched time period remaining un-started while the touch detector continues to detect touching of the key and the press detector does not detect pressing of the key, the display displaying a candidate character last displayed when the press detector detected pressing of the key,
    wherein the controller converts the candidate character display on the display unit to a finalized character, when a corresponding region corresponding to the pressed key is touched, each key having a different corresponding region directly adjacent thereto, each corresponding region including at least a portion of a key corresponding thereto or a region surrounding the key corresponding thereto.

2. The mobile terminal device according to claim 1, wherein the controller converts the candidate character displayed on the display unit to a finalized character, when a corresponding region provided for the pressed key is touched without waiting for expiration of the predetermined untouched time period.

3. The mobile terminal device according to claim 1, wherein display unit displays the candidate characters in a second display area in rows and columns corresponding to rows and columns of the plurality of keys.

4. The mobile terminal device according to claim 3, wherein the display unit highlights a character in the second display area corresponding to the key touched by the user.

5. The mobile terminal device according to claim 4, wherein the display unit updates the character displayed in the second display area to a subsequent character when a corresponding key is pressed.

6. The mobile terminal device according to claim 1, wherein a character assigned to the key pressed by the user is displayed in a first display region of the display unit, and a character corresponding to another key touched by the user is highlighted in a second display region of the display unit, the character assigned to the other key being displayed on the first region of the display unit when the press detector detects that the other key is pressed by the user.

7. A mobile terminal device provided with a plurality of keys, comprising:
- a touch detector configured to detect a touched key;
- a press detector configured to detect a pressed key;
- a display unit configured to sequentially display characters, as candidate characters, assigned to the pressed key in a first display area, the display unit displaying characters assigned to each of the plurality of keys in a second display area, when the press detector detects the pressed key; and
- a controller configured to convert the candidate character displayed on the first display area of the display unit to a finalized character, when a corresponding region corresponding to the pressed key is touched, each key having a different corresponding region directly adjacent thereto, each corresponding region including at least a portion of a key corresponding thereto or a region surrounding the key corresponding thereto.

8. The mobile terminal device according to any one of claims 2 and 7, further comprising:
- a key-arranged surface on which the a plurality of keys are arranged, wherein,
- the touch detector detects a touching of the key-arranged surface as well as the touched key, and
- the corresponding region is an area on the key-arranged surface excluding the pressed key.

9. The mobile terminal device according to any one of claims 2 and 7, wherein the corresponding region is a key different from the pressed key.

10. The mobile terminal device according to claim 7, wherein the controller converts the candidate character displayed on the display unit to a finalized character, when the user touches a corresponding region of the pressed key while the pressed key is pressed.

11. The mobile terminal device according to claim 7, further comprising:
- a setting unit configured to set a position of the corresponding region, a size of corresponding region, or a number of positions as corresponding regions in accordance with a user input.

12. The mobile terminal device according to claim 7, further comprising:
- a key assignment information storage unit configured to store position, size and number of the plurality of contact regions, the position, size and number of the plurality of contact regions being updated by overwriting stored position, size and number values.

13. A mobile terminal device which is provided with a plurality of keys, the plurality of keys being respectively located in a plurality of rows extending in the right-left direction of the mobile terminal device, the plurality of rows being arranged in the vertical direction of the mobile terminal device, the mobile terminal device comprising:
- a touch detector configured to detect a user touching a key;
- a key specification unit configured to specify the key touched as an effective contact key, when the user touching the key is detected;
- an upper position specification unit configured to specify an upper representative position as a single position set according to positions of a plurality of upper contact keys;
- a lower position specification unit configured to specify a lower representative position as a single position set according to positions of a plurality of lower contact keys, the lower contact keys being a plurality of keys touched by the user which are arranged in a row lower than an uppermost row; and
- a screen changing unit configured to change a screen related to a function assigned to the effective contact key specified by the key specification unit,
- wherein when the touch detector detects multiple keys being simultaneously touched on different rows, the key specification unit specifies the effective contact key as a rightmost upper contact key when the upper representative region is right of the lower representative region, and the key specification unit specifies the effective contact key as a leftmost upper contact key when the upper representative region is left of the lower representative region, and
- the screen changing unit changes the screen according to a function assigned to a pressed key, when a corresponding region corresponding to the pressed key is touched each key having a different corresponding region directly adjacent thereto, each corresponding region including at least a portion of a key corresponding thereto or a region surrounding the key corresponding thereto.

14. The mobile terminal device according to claim 13, wherein,
- the plurality of keys are arranged in a plurality of rows extending in the right-left direction of the mobile terminal device,
- the plurality of rows are arranged in the vertical direction of the mobile terminal device, and
- the key specification unit specifies one of a plurality of upper contact keys as the effective contact key when the upper contact key is single, and the upper contact keys are the plurality of keys touched by the user arranged in the row of uppermost in the vertical direction.

15. The mobile terminal device according to claim 13, further comprising:
- a specification result storage configured to store a specification history result, the specification history is a history of specifying the effective contact key according to the positional relationship,
- wherein, the key specification unit specifies the effective contact key by referring to the specification history result, when the upper representative position and the lower representative position are aligned in the right-left direction.

16. The mobile terminal device according to claim 13, further comprising:
- a touch time storage configured to store information associating the keys touched by the user and a touch time, the touch time being a time when the user touching the keys is detected; and
- a grouping unit configured to form key groups from the plurality of keys touched by the user when the user touches the plurality of keys, the key groups respectively consisting of the key adjacent to one another, wherein, the key specification unit identifies the key group including a key having a latest touch time, and specifies the effective contact key from the keys included in the key group identified.

17. The mobile terminal device according to claim 13, further comprising:

a barycenter coordinate detector configured to calculate a position of the upper representative region according to positions of uppermost keys of the multiple keys simultaneously touched, and to calculate a position of the lower representative region according to positions of lowermost keys of the multiple keys being touched.

18. A non-transitory computer-readable medium storing computer-readable instructions for use in a mobile terminal device including a plurality of keys, the plurality of keys being respectively located in a plurality of rows extending in the right-left direction of the mobile terminal device, the plurality of rows being arranged in the vertical direction of the mobile terminal device, the computer-readable instructions when executed by a computer cause the computer to perform the method comprising:

specifying an upper representative position as a single position set according to positions of a plurality of upper contact keys;

specifying a lower representative position as a single position set according to positions of a plurality of lower contact keys, the lower contact keys being a plurality of keys touched by the user which are arranged in a row lower than an uppermost row;

detecting a user touching the keys;

specifying the key touched by the user as an effective contact key, when simultaneous touching of multiple keys on different rows is detected, on the basis of key specification criteria corresponding to an arrangement of the keys; and changing a screen related to a function assigned to the effective contact key, wherein a rightmost upper contact key is specified as the effective contact key when the upper representative position is right of the lower representative position, and a leftmost upper contact key is specified as the effective key when the upper representative region is left of the lower representative region, and the screen changing unit changes the screen according to a function assigned to a pressed key, when a corresponding region corresponding to the pressed key is touched each key having a different corresponding region directly adjacent thereto, each corresponding region including at least a portion of a key corresponding thereto or a region surrounding the key corresponding thereto.

19. The non-transitory computer-readable medium to claim 18, further comprising:

a barycenter coordinate detector configured to calculate a position of the upper representative region according to positions of uppermost keys of the multiple keys simultaneously touched, and to calculate a position of the lower representative region according to positions of lowermost keys of the multiple keys being touched.

* * * * *